United States Patent
Shields et al.

(10) Patent No.: US 9,135,864 B2
(45) Date of Patent: Sep. 15, 2015

(54) SYSTEMS AND METHODS FOR ACCURATELY REPRESENTING HIGH CONTRAST IMAGERY ON HIGH DYNAMIC RANGE DISPLAY SYSTEMS

(71) Applicant: Dolby Laboratories Licensing Corporation

(72) Inventors: Jerome Shields, Lumberton, NJ (US); Marek Hadlaw, San Francisco, CA (US); Gopal Erinjippurath, San Francisco, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 330 days.

(21) Appl. No.: 13/719,412

(22) Filed: Dec. 19, 2012

(65) Prior Publication Data

US 2013/0106923 A1    May 2, 2013

Related U.S. Application Data

(63) Continuation-in-part of application No. PCT/US2012/034967, filed on Apr. 25, 2012, and a continuation-in-part of application No. 12/780,749, filed on May 14, 2010.

(60) Provisional application No. 61/479,958, filed on Apr. 28, 2011.

(51) Int. Cl.
*G09G 3/34*     (2006.01)
*G02F 1/1335*   (2006.01)
(Continued)

(52) U.S. Cl.
CPC ........... *G09G 3/3406* (2013.01); *G02F 1/1333* (2013.01); *G02F 1/1347* (2013.01);
(Continued)

(58) Field of Classification Search
CPC .......... G09G 3/3406; G09G 3/34; G09G 3/36
See application file for complete search history.

(56) References Cited

U.S. PATENT DOCUMENTS

| 4,380,023 A | 4/1983 | Mir |
| 4,952,036 A | 8/1990 | Gulick |

(Continued)

FOREIGN PATENT DOCUMENTS

| CN | 2662288 | 12/2004 |
| EP | 0579402 | 1/1994 |

(Continued)

OTHER PUBLICATIONS

Jo, Myung-Hoon, et al. "Analysis of Light Leakage of LCD Module and Improvement by Cell Rubbing Angle" published in 2009.
(Continued)

*Primary Examiner* — Fred Tzeng

(57) ABSTRACT

A dual-panel display system is provided that comprises control modules and algorithms to select codeword pairs (CWs) to drive a first image-generating panel and a second contrast-improving panel. The first codewords is selected by considering some characteristics of the input image data (e.g., peak luminance) and to improve some image rendering metric (e.g., reduced parallax, reduced contouring, improved level precision). The first codeword may be selected to be the minimum first codeword within a set of codeword pairs that preserves the peak luminance required by the input image data. Also, the first codeword may be selected to minimize the number of Just Noticeable Difference (JND) steps in the final image to be rendered. The second codeword may be selected to similarly improve image quality according to a given quality metric.

23 Claims, 23 Drawing Sheets

(51) Int. Cl.
*G02F 1/1347* (2006.01)
*G02F 1/1333* (2006.01)
*H04N 9/31* (2006.01)

(52) U.S. Cl.
CPC ........ *G02F1/133606* (2013.01); *G09G 3/3426* (2013.01); *H04N 9/3126* (2013.01); *G02F 2001/133601* (2013.01); *G09G 2300/023* (2013.01); *G09G 2320/0646* (2013.01); *G09G 2360/16* (2013.01)

(56) References Cited

U.S. PATENT DOCUMENTS

| | | | |
|---|---|---|---|
| 4,987,410 A | 1/1991 | Berman | |
| 5,371,618 A | 12/1994 | Tai | |
| 5,548,427 A | 8/1996 | May | |
| 5,589,963 A | 12/1996 | Gunning, III | |
| 5,682,180 A | 10/1997 | Young | |
| 5,717,474 A | 2/1998 | Sarma | |
| 5,801,796 A | 9/1998 | Lowe | |
| 5,966,192 A | 10/1999 | Higuchi | |
| 5,978,142 A | 11/1999 | Blackham | |
| 6,028,656 A | 2/2000 | Buhrer | |
| 6,094,243 A | 7/2000 | Yasunishi | |
| 6,118,904 A * | 9/2000 | Detch et al. | 382/245 |
| 6,184,953 B1 | 2/2001 | Greene | |
| 6,348,957 B1 | 2/2002 | Yamazaki | |
| 6,765,635 B1 | 7/2004 | Kelly | |
| 6,788,360 B2 | 9/2004 | Penterman | |
| 6,891,672 B2 | 5/2005 | Whitehead | |
| 7,002,533 B2 | 2/2006 | Sayag | |
| 7,050,122 B2 | 5/2006 | Gibbons | |
| 7,218,365 B2 | 5/2007 | Chang | |
| 7,307,679 B2 | 12/2007 | Toyooka | |
| 7,324,178 B2 | 1/2008 | Lee | |
| 7,342,721 B2 | 3/2008 | Lukyanitsa | |
| 7,400,377 B2 | 7/2008 | Evans | |
| 7,404,645 B2 | 7/2008 | Margulis | |
| 7,450,774 B2 * | 11/2008 | Hahm et al. | 382/245 |
| 7,538,876 B2 | 5/2009 | Hewitt | |
| 7,630,030 B2 | 12/2009 | Jang | |
| 7,639,328 B2 | 12/2009 | Jung | |
| 7,641,346 B2 | 1/2010 | Berman | |
| 7,646,448 B2 | 1/2010 | Robinson | |
| 7,705,816 B2 | 4/2010 | Chen | |
| 7,787,078 B2 | 8/2010 | Hirai | |
| 7,843,529 B2 | 11/2010 | Ikeno | |
| 7,916,223 B2 | 3/2011 | Kitagawa | |
| 7,956,821 B2 | 6/2011 | Ikeno | |
| 7,986,322 B1 | 7/2011 | Zuverink | |
| 7,990,483 B2 | 8/2011 | Park | |
| 8,009,248 B2 | 8/2011 | Nakai | |
| 8,107,041 B2 | 1/2012 | Liu | |
| 8,212,741 B2 | 7/2012 | Raman | |
| 8,228,263 B2 | 7/2012 | Ikeno | |
| 2004/0008298 A1 | 1/2004 | Kwok | |
| 2004/0263942 A1 | 12/2004 | Lopez | |
| 2006/0139503 A1 | 6/2006 | Larson | |
| 2006/0268197 A1 | 11/2006 | Valliath | |
| 2007/0200809 A1 | 8/2007 | Yamazaki | |
| 2007/0242028 A1 | 10/2007 | Kitagawa | |
| 2007/0242186 A1 | 10/2007 | Ikeno | |
| 2007/0242197 A1 | 10/2007 | Watson | |
| 2007/0279372 A1 | 12/2007 | Brown Elliott | |
| 2007/0279374 A1 | 12/2007 | Kimura | |
| 2008/0018624 A1 | 1/2008 | Cernasov | |
| 2008/0088649 A1 | 4/2008 | Ikeno | |
| 2008/0094539 A1 | 4/2008 | Kim | |
| 2008/0158245 A1 | 7/2008 | Lieb | |
| 2008/0165204 A1 | 7/2008 | Klompenhouwer | |
| 2008/0174798 A1 | 7/2008 | Cho | |
| 2008/0273147 A1 | 11/2008 | Kim | |
| 2008/0284951 A1 | 11/2008 | Son | |
| 2009/0027323 A1 | 1/2009 | Choi | |
| 2009/0027598 A1 | 1/2009 | Ikeno | |
| 2009/0213576 A1 | 8/2009 | Chang | |
| 2009/0268904 A1 | 10/2009 | Verhulst et al. | |
| 2009/0295707 A1 | 12/2009 | Furukawa | |
| 2009/0304078 A1 * | 12/2009 | Yuasa et al. | 375/240.12 |
| 2010/0020242 A1 | 1/2010 | Lammers | |
| 2010/0079703 A1 | 4/2010 | Chung | |
| 2010/0097405 A1 | 4/2010 | Guo | |
| 2010/0220178 A1 | 9/2010 | Takahashi | |
| 2010/0225679 A1 | 9/2010 | Guncer | |
| 2010/0289836 A1 | 11/2010 | Whitehead | |
| 2011/0032252 A1 | 2/2011 | Ohta | |
| 2011/0080421 A1 * | 4/2011 | Capener | 345/589 |
| 2011/0310116 A1 | 12/2011 | Muijs | |
| 2012/0062607 A1 | 3/2012 | Erinjippurath | |
| 2012/0074851 A1 | 3/2012 | Erinjippurath | |
| 2012/0075435 A1 | 3/2012 | Hovanky | |
| 2012/0086779 A1 | 4/2012 | Morifuji | |

FOREIGN PATENT DOCUMENTS

| | | |
|---|---|---|
| EP | 0745884 | 12/1996 |
| GB | 2405516 | 3/2005 |
| JP | 3-174580 | 7/1991 |
| JP | 5-88197 | 4/1993 |
| JP | 6-168477 | 6/1994 |
| JP | 2000-227577 | 8/2000 |
| JP | 2000-321408 | 11/2000 |
| JP | 2006003393 | 1/2006 |
| KR | 10-2007-0103321 | 10/2007 |
| KR | 10-2007-0103322 | 10/2007 |
| KR | 10-2008-0034820 | 4/2008 |
| WO | 2006/010244 | 2/2006 |
| WO | 2006/044298 | 4/2006 |
| WO | 2006/062325 | 6/2006 |
| WO | 2007/110582 | 10/2007 |
| WO | 2008/072162 | 6/2008 |
| WO | 2009/122329 | 10/2009 |
| WO | 2012/113856 | 8/2012 |
| WO | 2012/148983 | 11/2012 |

OTHER PUBLICATIONS

Guarnieri, G. et al. "Image-Splitting Techniques for a Dual-Layer High Dynamic Range LCD Display" Journal of Electronic Imaging Oct.-Dec. 2008.

Zhang, Dan, "Appearance-Based Image Splitting for HDR Display Systems" Rochester Institute of Technology, 2011.

Urey, H. et al. "State of the Art in Stereoscopic and Autostereoscopic Displays" Apr. 2011, proc of IEEE, vol. 99 Issue 4, pp. 540-555.

Guarnieri G., et al. "Minimum-Error Splitting Algorithm for a Dual-Layer LCD Display—Part I: Background and Theory" Dec. 2008, Journal of Display Technology, vol. 4, Issue 4 pp. 383-390.

Lin, T.C. et al. "Preserving Depth Resolution of Synthesized Images Using Parallax-Map Based DIBR for 3D-TV" May 2010, Consumer Electronics, IEEE Transactions on vol. 56, Issue 2, pp. 720-727.

* cited by examiner

SYSTEMS AND METHODS FOR ACCURATELY REPRESENTING HIGH CONTRAST IMAGERY ON HIGH DYNAMIC RANGE DISPLAY SYSTEMS

CROSS-REFERENCE TO RELATED APPLICATIONS

This patent application is a continuation-in-part (CIP) application and claims the benefit of, and priority to, the following applications: (1) International Publication Number WO2012/149001 (PCT/US2012/034967), filed on Apr. 25, 2012, which in turn takes priority to U.S. Provisional Patent Application Ser. No. 61/479,958, filed on Apr. 28, 2011, and (2) United States Patent Application Publication 2011/0279749 (U.S. Ser. No. 12/780,749), filed on May 14, 2010—all of which are hereby incorporated by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Technical Field

The present invention relates to High Dynamic Range Displays (HDR), and more particularly to HDR displays using dual modulation.

2. Discussion of Background

High Dynamic Range (HDR) displays are generally defined as having a dynamic range of greater than 800 to 1. Recent advances in technology have produced displays claiming contrast ratios of more than 1,000,000 to 1.

Generally speaking, these higher contrast ratio HDR displays utilize local dimming of the backlight that illuminates the LCD panel. An early patent in this area, U.S. Pat. No. 6,891,672, by Whitehead, Ward, Stuerzlinger, and Seetzen entitled "HIGH DYNAMIC RANGE DISPLAY DEVICES" describes the fundamental techniques. Such techniques include illuminating the LCD panel with an approximation of a desired image and then further modulating the approximation with the LCD panel so that it approaches the desired image.

Other forms of improving contrast have also been presented, including "darkening" of an LCoS projected image through the use of an LCD panel (Berman), and the use of multiple registered modulating layers or premodulators (e.g., Blackham U.S. Pat. No. 5,978,142, Gibbon U.S. Pat. No. 7,050,122, and others). However, commercially available HDR displays have deficiencies in reproducing starfields and other challenging images mainly due to parallax, backlight leakage, and other issues, and artifacts resulting therefrom.

SUMMARY

A dual-panel display system is provided that comprises control modules and algorithms to select codeword pairs (CWs) to drive a first image-generating panel and a second contrast-improving panel. The first codewords is selected by considering some characteristics of the input image data (e.g., peak luminance) and to improve some image rendering metric (e.g., reduced parallax, reduced contouring, improved level precision). The first codeword may be selected to be the minimum first codeword within a set of codeword pairs that preserves the peak luminance required by the input image data. Also, the first codeword may be selected to minimize the number of Just Noticeable Difference (JND) steps in the final image to be rendered. The second codeword may be selected to similarly improve image quality according to a given quality metric.

In one embodiment, a dual-panel display system is provided comprising: a backlight; a first image-generating panel; a second contrast-improving panel; a control module for selecting a codeword (CW) pair for driving said first image-generating panel and said second contrast-improving panel respectively according to input image data; and further wherein said control module is capable of selecting a CW pair to improve final image rendering presented to a viewer.

In another embodiment, a method for selecting a codeword (CW) pair for driving said first image-generating panel and said second contrast-improving panel respectively according to input image data; the steps of said method comprising: inputting image data to be rendered by said dual-panel display system; finding a first CW for driving said first image-generating panel based upon input image data; and finding a second CW for driving said second contrast-improving panel, said first CW and said second CW comprising a CW pair that improves final image rendering according to a desired metric.

The invention may be implemented as a display or as a system and portions of the invention may be conveniently implemented as a method, for example, in programming on a general purpose computer, or networked computers, and the results may be displayed on an output device connected to any of the general purpose, networked computers, or transmitted to a remote device for output or display. In addition, any components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and co-ax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1A:
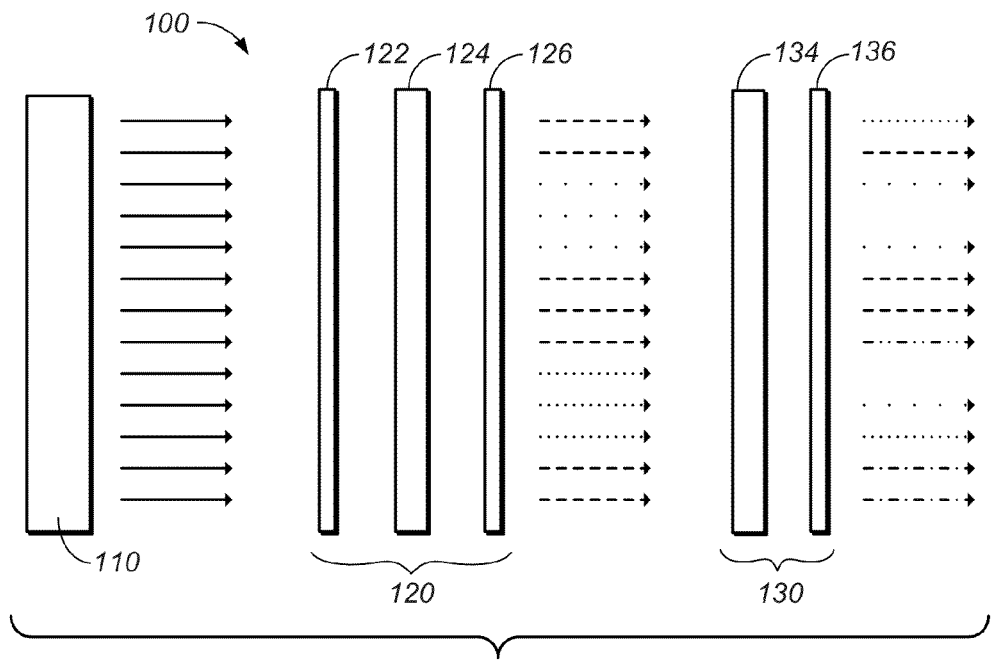
FIGS. 1A, 1B and 2A are schematic diagram embodiments of high dynamic range display systems made according to an embodiment of the present invention.

Referring now to the drawings, wherein like reference numerals designate identical or corresponding parts, and more particularly to FIG. 1A thereof, there is illustrated a new construction for a high dynamic range display 100 according to an embodiment of the present invention. The display 100 includes a backlight 110 which may be a standard CCFL or other broadband lighting source (e.g., LEDs, OLEDs, etc.). In addition, the backlight may be direct lit (light source(s) directly illuminating downstream modulation panels) or edge lit (as is popular in many thin screen LCD display designs). Further yet, the backlight may be constant, globally dimmed, or locally dimmed. The light source for this display can be white, controllable luminance, or multiple color driven.

The backlight 110 illuminates downstream modulators, including, in this example, an LCD panel 120 which modulates the backlight in intensity and color. A controllable polarizer (or contrast-improving panel) 130 further modulates the light as to polarity (and which may then be attenuated by a polarization layer to effect an intensity modulation of the output light).

The LCD panel 120 is constructed to include an initial polarizing layer 122, which may be for example, any of a reflective polarizer, an absorptive polarizer, or a polarization converter, or another device that provides an initial uniform polarization orientation from which downstream modulations are to be based. Preferably, the initial polarizing layer 122 is a reflective polarizer so that light that the reflected light may be "re-cycled" by reflection into and then back out of the optical cavity of the backlight 110. An active layer 124 comprises liquid crystals (e.g., twisted nematic) and color filters (e.g., typically RGB). The liquid crystals are oriented based on an energization of the active layer intended to rotate or change polarization of light passing through the filters. A passive polarization analyzer and/or finishing polarizer 126, which may be, for example, an absorptive polarizing layer that filters out (or passes) light of a predefined polarization as changed by the liquid crystals.

The controllable polarizer (contrast-improving panel) 130, may be, for example, the active elements of an LCD panel (e.g., a TN layer) combined with a passive polarizer (e.g., active layer, or active elements 134 and passive polarizer 136). The controllable polarizer 130 may be, for example, an LCD panel without color filters. As shown, the initial polarizer of this second LCD panel may be removed, relying, in this specific case, on the passive polarizing analyzer 126 for an initial uniform polarization.

In the case of a constant backlight, the backlight 110 produces an initial light 112 which is constant or uniform. In other embodiments, the initial light 112 may be modulated, e.g., any of spatially modulated light, pre-modulated light, globally dimmed light, individual RGB dimmed, temporally modulated light, or others, and/or a combination of the above. The initial light 112 illuminates the first downstream modulator (note that additional optical elements may be placed at virtually any point in the light/image chain, including any of diffusers, collimators, DEV, Brightness Enhancement Films (BEFs), etc.). Other optical elements including reflectors may also be utilized depending on the design (e.g., side lit display designs may utilize, for example, a reflector/diffuser combination to redirect and diffuse light from a side light path that is mainly parallel to a display screen to a light path that is mainly perpendicular to the display screen.

The image-generating panel 120 modulates the initial light 112 in a manner that is physically similar to a standard LCD display. The energization of the image-generating panel 120 is calculated to accommodate the design and use of the controllable polarizer 130 and is discussed in more detail further below. 1st modulated light 128 is emitted from the image-generating panel 120 and illuminates the contrast-improving panel 130.

The contrast-improving panel 130 further modulates the 1st modulated light 128 in a manner that increases the contrast and, for example, resolution of the modulated light, resulting in a 2nd modulated light, or, in this case, better described as final image light 138. The increased resolution results, for example, when the contrast-improving panel 130 has more pixels for a given area than the image-generating panel 120.

Increased spatial resolution may also result when the active elements 134 are of similar/same construction as active elements of the image-generating panel 120 (e.g., LCD panel 120 and contrast-improving panel 130 are the same except that the contrast-improving panel 130 has the color filters removed). Benefits may also be obtained when the pixels of the contrast-improving panel are of a different shape, offset, size (e.g., smaller or larger), orientation (e.g., 0, 45, or 90 degrees), or layout compared to the image-generating panel.

The active elements 134 rotate polarization of individual "pixels" of the 1st modulated light 128 based on a desired local dimming effect. Pixels in quotations because the pixels of first modulated light 128 may be different from pixels of the active elements 134. In the case where a design utilizes an LCD panel (e.g., LCD panel 120) having active elements that are the same as active elements 134, the pixels of the active elements 134 are still different from the pixels of the LCD panel 120 because the pixels of the LCD panel 120 each include three active elements (one for each Red, Green, and Blue filter that forms each LCD pixel), where each element of the active elements 134 may be defined as a single pixel.

The active elements 134 further modulate the 1st modulated light 128 on a pixel-by-pixel basis via the pixels of the active elements 134 by imposing a prescribed amount of polarization rotation. The modulation is then effected by passive polarizer 136 that absorbs amounts of light proportional to the light's difference in polarization as modulated upstream. The contrast-improving panel 130 is shown downstream from the image-generating panel 115, but may be placed upstream of the image-generating panel 115.

Figure 1B:
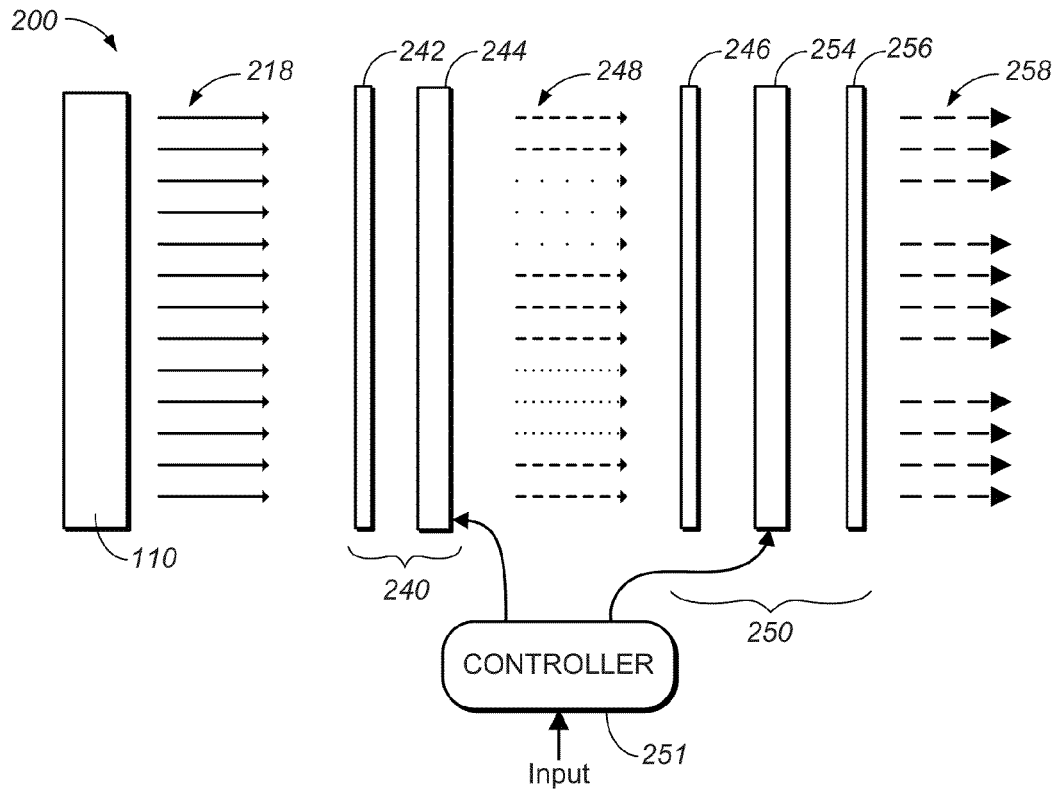

FIG. 1B is a schematic diagram of a high dynamic range display 200 according to another embodiment of the present invention. In FIG. 1B, a contrast-improving panel 240 (e.g., a controllable polarizer or modified controllable polarizer) is placed upstream of an image-generating panel 250. Backlight 110 illuminates the contrast-improving panel with light 218. The contrast-improving panel 240 produces modulated light 248, which is a locally dimmed version of the backlight 218. Modulated light 248 is further modulated for color and brightness by a color panel 250 (e.g., an LCD panel), producing final image light 258. Controller 251 (which may be configured for this and several other embodiments in the present application) asserts drive signals to the active elements of panels 240 and 250 in response to input image data (e.g., input video).

As shown, the contrast-improving panel 240 includes an initial polarizer 242, and an active elements panel 244 (e.g., TN layer w/o color filters). The color panel 250 is constructed with a polarizer 246 (e.g., an absorptive polarizer) which operates as both an initial polarizer for the color panel and as an analyzer for the active elements panel 242. A color active layer 254 (e.g., TN layer+color filters) modulate the light as to intensity and color, and a passive polarizer 256 effects the modulation by polarization based filtering.

Figure 2A:
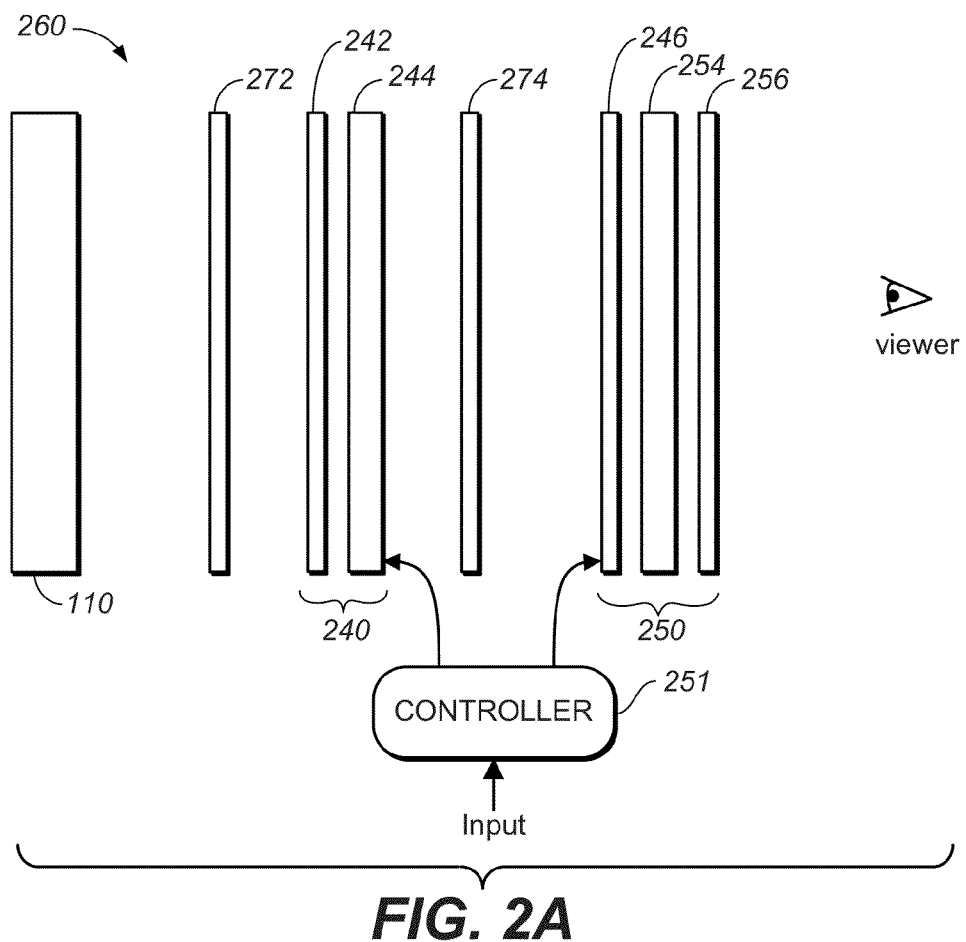

FIG. 2A is a schematic diagram of a high dynamic range display 260 according to another embodiment of the present invention. The display 260 improves performance by the addition of appropriately designed diffusers. The additional diffusers include an upstream diffuser 272 and a mid-stream diffuser 274. Upstream diffuser is a "rough" diffuser that is designed to diffuse the backlight into an evenly distributed light source. In the case of locally dimmed backlight embodiment, the upstream diffuser is designed to cause the backlight to smoothly vary across pixels of the upstream modulator (e.g., contrast-improving panel 244 in this example).

Figure 2B:
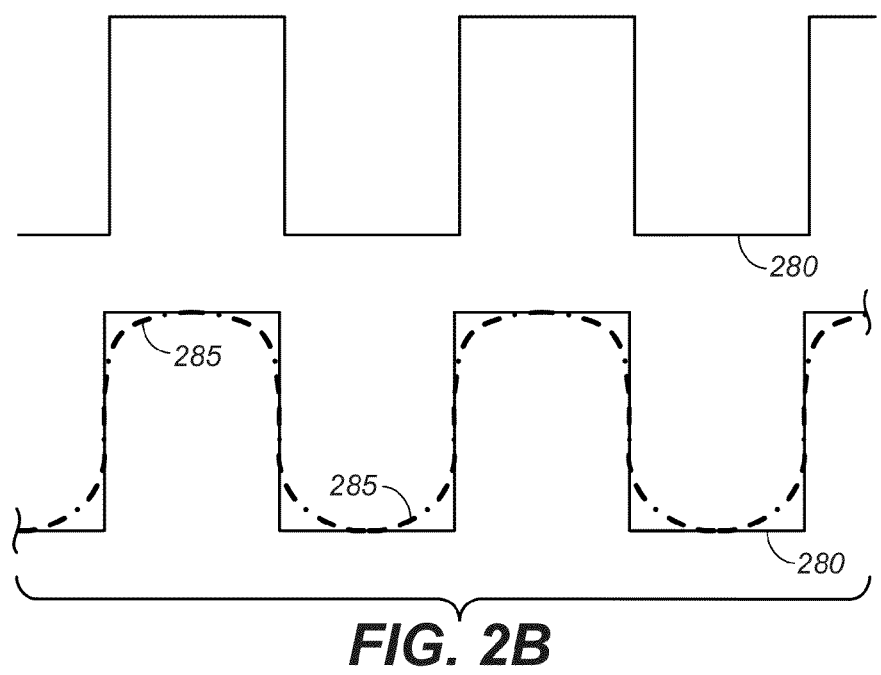
FIG. 2B shows a graph that illustrates an approximate resolution of modulated light in an on-off pattern as might be emitted from a contrast-improving panel or other upstream modulator.

The midstream diffuser is specifically designed to smooth light emitted from the upstream modulator (e.g., contrast-improving panel 244 in this example). Preferably, the midstream diffuser operates to remove and smooth rough edges of the lights emitted from each pixel of the upstream modulator. To do so, the midstream diffuser is, for example, a diffuser that is of higher diffusion resolution (e.g., diffuses smaller features) than the upstream diffuser and is capable of maintaining the modulated resolution of light emitted from the upstream modulator. For example, FIG. 2B provides graphs that illustrate an approximate resolution of modulated light 280 in an on-off pattern as might be emitted from a contrast-improving panel or other upstream modulator. The midstream diffuser then operates to remove sharp edges and smooth the emitted light while preferably maintaining as much peak brightness and darkness as possible as shown by diffused light 285.

Diffused light 285 takes away the sharp edges (e.g. higher frequencies) of the upstream-modulated light and is sufficient to "break-up" or prevent the formation of moiré patterns that typically develop as artifacts in displays with various combinations of grid like panels and/or other optical elements. Also worth further discussion is that the diffused light 285 emitted from the mid-stream diffuser 274 is preferably at an entirely different level of diffusion compared to the diffused light emitted from the upstream diffuser 272. The upstream diffuser may, for example, cause the backlight to smoothly vary from one lighting element in the backlight to the next. In contrast, the mid-stream diffuser may, for example, provide smooth variances of lighting within a single pixel and mix light only from directly adjacent pixels. In one embodiment, the upstream and mid-stream diffusers differ in diffusion coarseness by, for example, an order of magnitude or more. In fact, best results may occur with an even much greater differential in resolution between the upstream and midstream diffusers.

In one embodiment, the upstream diffuser mixes and smoothes light from multiple light sources in the backlight while the midstream diffuser smoothes light on the order of single contrast-improving size pixels. In another embodiment, the upstream diffuser may be described as mixing light such that a single pixel of the upstream diffuser is illuminated by a plurality of light sources in the backlight, and the mid-stream diffuser may be described as mixing light on a sub-pixel level (sub-pixels of the upstream modulator). In one embodiment, the upstream diffuser is a rough diffuser compared to a relatively fine mid-stream diffuser. In one embodiment, the mid-stream diffuser provides diffusion at less than a sub-pixel resolution. In another embodiment, the mid-stream diffuser comprises a diffuser with a spatial transfer function that either cuts-off, removes, repositions, or eliminates high frequency elements of light that would otherwise be emitted. In another embodiment, the mid-stream diffuser may consist of a material that diffuses light more in one direction than in another to compensate for the non-squareness of the upstream pixels.

In yet another embodiment, the mid-stream diffuser comprises a diffuser that preserves enough detail such that the resolution of the modulated light is not altered (e.g., resolution not altered, but higher frequency details are no longer present). The mid-stream diffuser may be designed to mask high frequency details in the light modulated by the contrast-improving panel. For example, the mid-stream diffuser may comprise an optical low-pass filter that passes the lowest 4 harmonics (e.g., See FIG. 2B, the 4 lowest harmonics of 280 which approximately reproduces 285), but may be, for example, between 2-8 harmonics of the fundamental frequency. The mid-stream diffuser removes, for example, sub-pixel level features placed into the light stream by the contrast-improving panel. In most embodiments, the size of a pixel in the contrast-improving panel is smaller than a distance between the active panels (e.g., distance between the contrast-improving panel and the image-generating panel).

The coarseness of the mid-stream diffuser may, for example, be determined in part by a geometry of cells and surrounding areas of the contrast-improving panel. For example, if the contrast-improving panel comprises cells that are square with equivalent amounts of hardware (wires, cell walls, etc.) on all sizes, then the coarseness of the midstream diffuser would generally be uniform in all directions. If the cells of the contrast-improving panel are rectangular then the coarseness of the midstream diffuser, assuming all other factors being equal, would be coarser in the direction corresponding to the longer side of the rectangle and finer in the direction corresponding to the shorter side of the rectangle.

The coarseness of the mid-stream diffuser may also be determined, for example, by a scale and/or physical or other measurable un-controlled features and/or imperfections in the cells of the contrast-improving panel. The coarseness is determined at a resolution that masks the uncontrollable features but still allows the resolution of the panel (in the form of modulated light) to pass mostly unaltered. For example, space between the cells of the contrast-improving panel may, for example, block light or pass some amount of un-modulated light. Blocked light or un-modulated light passed by the contrast-improving panel results in an uncontrolled or uncontrollable in the image being formed.

Other uncontrollable features may include, for example, differences in modulation in a cell not attributable to its energization level and/or non-uniformity within a cell—any of which may be due to, for example, manufacturing or component quality variances. In one embodiment, the coarseness of the mid-stream modulator is selected so that one or more of the uncontrollable features are at least one of removed, masked, or otherwise minimized through diffusion. In one embodiment, the uncontrollable features are different depending on a direction (e.g., horizontal and vertical), and each direction (e.g., at least two directions in a single diffuser) having different diffusion properties related to the different amounts of uncontrollable features found in those directions.

Note that above, the polarizer 246 had been used as both an analyzer for the upstream modulator 244 and an initial orientation polarizer for downstream modulator 254. The mid-stream diffuser 274 may be specially constructed to include polarization or to maintain existing polarization. In the case where mid-stream diffuser 274 maintains polarization (e.g., a diffuser that does not substantially alter the polarization of light being diffused), then polarizer 246 operates as both the analyzer and initial orientation polarizer as described above. However, diffusers typically will impart more polarization alteration than is desirable and therefore the addition of a polarizer to diffusion layer 274 is desirable so that the light may be analyzed prior to diffusion and accompanying polarization changes. This additional polarizer will increase contrast at the expense of brightness. The present invention includes designing a display for either increased contrast or brightness by respectively including or forgoing an additional polarizer between active layers.

The embodiments of FIG. 1A, FIG. 1B, and FIG. 2A are constructed so that the modulators (e.g., contrast-improving panel 240 and image-generating panel 250) are in close proximity to each other, which, as one benefit, reduces parallax caused by a separation between the panels. In the present invention, the modulators are sandwiched together either directly or separated by thin films, air gaps, or optical stack items such as diffusers, collimators or other optical elements that are relatively thin compared to glass and other layers of an LCD panel. Even with the close proximity of the panels, parallax may occur, particularly when difficult images or patterns are displayed and viewed at off-normal angles. The present inventors have realized that a specific configuration of panels brings the active layers of the contrast-improving panel and the image-generating panel closer together, further reducing parallax effects.

Figure 3A:
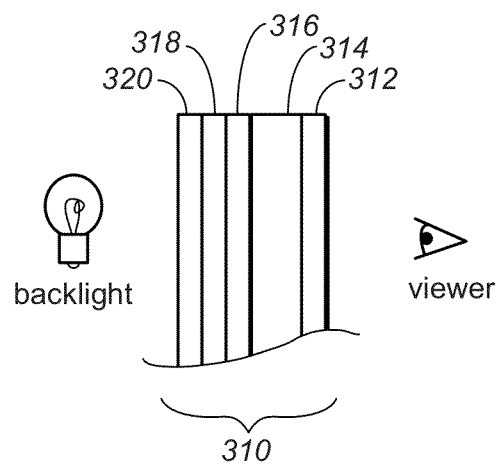
FIG. 3A is a drawing illustrating an arrangement of layers in a typical LCD panel.

Construction of a typical LCD panel 310 is illustrated in FIG. 3A. A first layer from the viewing side is a polarizing (analyzing) layer 312. Next, a relatively thick transparent substrate 314 (e.g., glass) is shown. Etched on the non-viewing side of the glass are, for example, wires and/or electronics for controlling a liquid crystal layer 316. Laminated together with the substrate and liquid crystal layer(s) is a color filter layer 318 and an initial polarizing layer 320. In operation, a backlight illuminates the panel 310, polarizing layer 320 sets an initial polarization, color filters 318 provide the primary colors Red, Green, and Blue, and liquid crystal layer 316 rotates polarization of each R, G, and B light by an amount that each light is to be attenuated. The analyzing layer then absorbs amounts of the R, G, and B lights based on their respective polarizations as imparted by the liquid crystal layer.

Figure 3B:
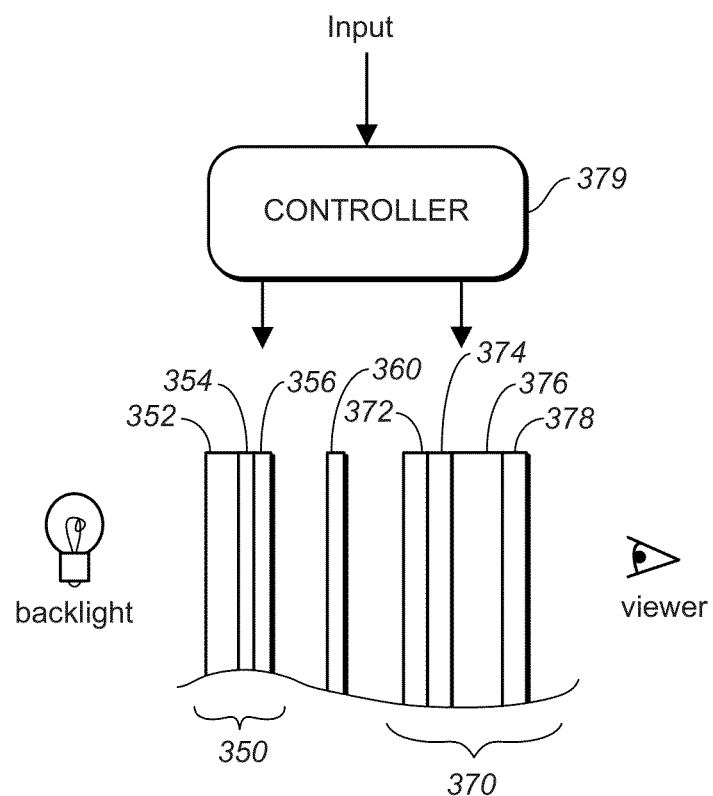
FIG. 3B is a drawing illustrating an arrangement of layers in an LCD panel and a brightness-improving panel according to an embodiment of the present invention.

FIG. 3B is a drawing illustrating an arrangement of layers in an image-generating panel and a contrast-improving panel according to an embodiment of the present invention. The arrangement is specifically designed to place the active layer of a contrast-improving panel 350 as close as possible to the active layer of the image-generating panel 370.

The layers of the contrast-improving panel 350 (from the backlight side) comprise a transparent substrate 352, an initial polarization layer 354, and an active layer 356 (e.g., controllable polarizing layer). A polarizer 360 (which may be a separate component or laminated together with either a contrast-improving panel 350 or an image-generating panel 370) performs double duty as both an analyzing polarizer for the contrast-improving panel 350 and an initial polarizing layer for the image-generating panel 370.

Continuing from the backlight side, the layers of the image-generating panel 370 comprise a color filter layer 372, active layer 374, substrate 376, and a polarization (analyzing layer) 378. Other arrangements of the layers may be utilized, including, for example, placing the polarization (analyzing) layer 378 on the backlight side of the substrate 376. The polarization (analyzing) layer 378 may also be placed on the backlight side of the color filter layer 372 and the active layer 374 may be placed as the first layer on the backlight side of the image-generating panel 370 (e.g., active layer-color filter layer-polarization (analyzing layer).

In an embodiment of the present invention, a contrast-improving panel and an image-generating panel are provided from similarly constructed LCD panels. The contrast-improving panel may, for example, be oriented backwards or upside down (flipped or inverted) relative to the LCD panel. This arrangement places the active layers of the contrast-improving panel and the image-generating panel closer together than would be in the case of similarly oriented panels of typical commercially available construction.

Figure 4A:
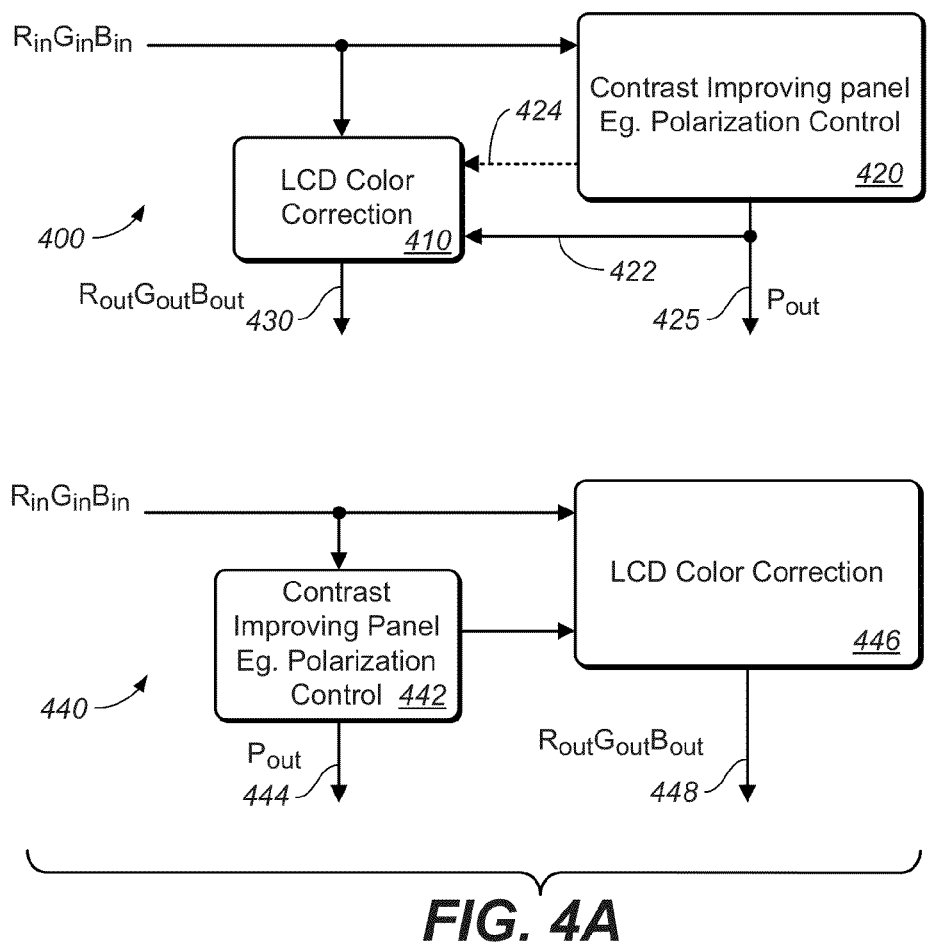
FIGS. 4A through 4D depict various embodiments of architectures of electronic devices that generates energization signals for LCD panels and contrast-improving panels made in accordance with the principles of the present invention.

FIG. 4A provides an architecture of an electronic device 400 (e.g., electronic circuitry, software architecture, programmable device architecture, plug-in, etc., or combinations thereof) that generates energization signals for image-generating panels and contrast-improving panels according to an embodiment of the present invention. A signal comprising, for example, $R_{in}$, $G_{in}$, $B_{in}$, is provided and/or extracted from an image or video source (e.g., DVD, Cable, Broadcast, Satellite, Streaming video, Internet, removable media, thumb drive, etc.) to an LCD Color Correction module 410 and a Polarization Control module 420. The polarization control module prepares a $P_{out}$ signal 425 that is connected to a contrast-improving panel (e.g., controllable polarization panel). In essence, the $P_{out}$ signal 425 indicates which pixels of the contrast-improving panel should be attenuated and the amount of attenuation. When using a controllable polarizer as the contrast-improving panel, this is performed, for example, by rotating the polarization of pixels to be attenuated by an amount proportional to the amount of desired attenuation for that pixel. The $P_{out}$ signal 425 may be, for example, a luminance calculation from a desired image defined by the $R_{in} G_{in} B_{in}$ data.

Processing in the Polarization Control Module, may include, for example, both a characterization that produces a corrected response curve (e.g., correcting RGB values for a given luminance) and a non-linear function (e.g., transfer function) that increases or decreases local contrast (makes pixels darker or lighter). The non-linear function may, for example, brighten or darken pixels in a manner that take into account the relative brightness of neighboring pixels. As shown, $P_{out}$ is then forwarded (fed into) the LCD Color Correction module 410 (via line 422). Alternatively, intermediate data may be exclusively or additionally forwarded to the LCD Color Correction module (via 424). The intermediate data may be, for example, partially processed data including any one or more steps performed to produce $P_{out}$ (e.g., characterization without applying the non-linear function).

Along with the $R_{in} G_{in} B_{in}$ data, the LCD Color Correction module prepares a $R_{out} G_{out} B_{out}$ signal 430 that is connected to control an image-generating panel (e.g., an LCD panel). The image-generating panel may be an LCD display, plasma display, or other type of display device.

In another embodiment, an electronic device 440 (e.g., electronic circuitry, software architecture, programmable device architecture, plug-in, etc., or combinations thereof) that generates energization signals for image-generating panels and contrast-improving panels according to an embodiment of the present invention. A signal comprising, for example, $R_{in} G_{in} B_{in}$, is provided from an image or video source (e.g., DVD, Cable, Broadcast, Satellite, Streaming video, Internet, removable media, thumb drive, etc.) to a Polarization Control Module 442 and an LCD Color Correction module 446. The Polarization Control Module 442 controls, for example, a polarizer that is physically located in a display and upstream of a corresponding color panel. The Polarization Control Module 442 may be configured to prepare modulation signals for a higher resolution than the resolution of the color panel (e.g., higher resolution in the number of controllable pixels and higher resolution in the total number of controllable elements in a given area of the corresponding panels). The polarization control module may be configured, for example, to control the active elements of a 1680× 1050 active element panel.

An output luminance $P_{out}$ 444 is produced. In turn, an LCD Color Correction module 446 provides signals 448 to control the corresponding color panel, which may be, for example, a 1920×1080 panel. The LCD Color Correction module 446 utilizes the video-in (RGB) signal plus results from the Polarization Control Module (e.g., luminance controlled by the upstream panels).

Figure 4B:
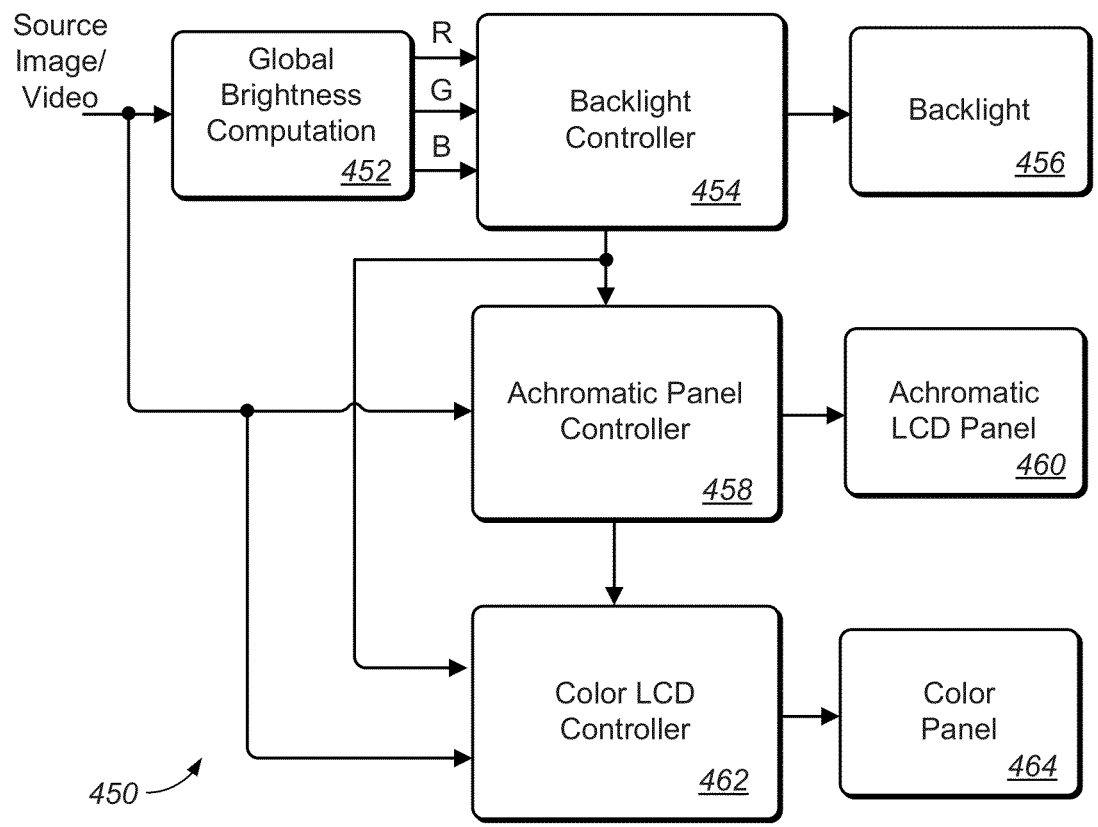

FIG. 4B is an architecture of an electronic device 450 (e.g., electronic circuitry, software architecture, programmable device architecture, plug-in, etc., or combinations thereof) that generates energization signals for image-generating panels and contrast-improving panels according to an embodiment of the present invention. A source image/video signal comprising, for example, $R_{in} G_{in} B_{in}$, is provided an image or video source (e.g., DVD, Cable, Broadcast, Satellite, Streaming video, Internet, removable media, thumb drive, etc.) to a global brightness computation module 452, which separates the light into its primary color components (e.g., R, G, and B) and provides that information to a backlight controller 454. A backlight control signal is generated, which may be, for example, a globally dimmed backlight value that is calculated (e.g., for each primary color value), which comprises, for example, an energization amount (or intensity) of individual primary colored lights in a backlight 456. The backlight is then energized according to the calculated backlight values for each primary.

In one embodiment, in the case of a locally dimmable backlight (e.g., a backlight that includes locally dimmed (or dimmable) light sources), the backlight controller may generate a spatially modulated backlight that illuminates downstream panels according to relative brightness in areas of the image (e.g., areas comprising, for example, each backlight pixel). The relative brightness may be computed, for example, based on the relative intensities of each primary color in a corresponding backlight pixel. Production of the spatially modulated backlight may also include, for example, consideration of the brightness of neighboring or nearby backlight pixels, and/or, in the case of video, brightness of pixels in preceding and/or subsequent image frames.

A Dimming/Polarization Controller 458 receives the backlight control signal and the input video/image signal, which are utilized to produce a contrast-improving control signal. The contrast-improving control signal specifies an amount of dimming produced by a contrast-improving panel 460. In various embodiments, the contrast-improving panel is of higher resolution than the image-generating panel (e.g., LCD panel) and may produce, for example, a very precise illumination profile.

In one embodiment, the image-generating panel is downstream from the contrast-improving panel and the higher resolution contrast-improving panel is utilized to produce an illumination profile that is intentionally blurred (blurred using the higher resolution capabilities of the contrast-improving panel as opposed to blurred because the contrast-improving panel is of lower resolution). The intentionally blurred image is blurred using the higher resolution capabilities of the display separate and apart from any blurring that occurs among or due to mixing of the backlights due to point spread functions or other qualities/orientations of the backlight or individual lights in the backlight. Although the aforementioned blurring is separate and apart from backlight blurring or mixing, embodiments of the invention may nonetheless include amounts of mixing or blurring of individual elements of the backlight.

A Color LCD Controller 462 receives the contrast-improving control signal, the backlight control signal, and the image/video signal which are utilized to produce an image-generating control signal that specifies the energization of the color panel 485 relative to the upstream illumination (e.g., in various embodiments the combined backlight and contrast-improving panel produce the upstream illumination) provided to the color panel 464.

Figure 4C:
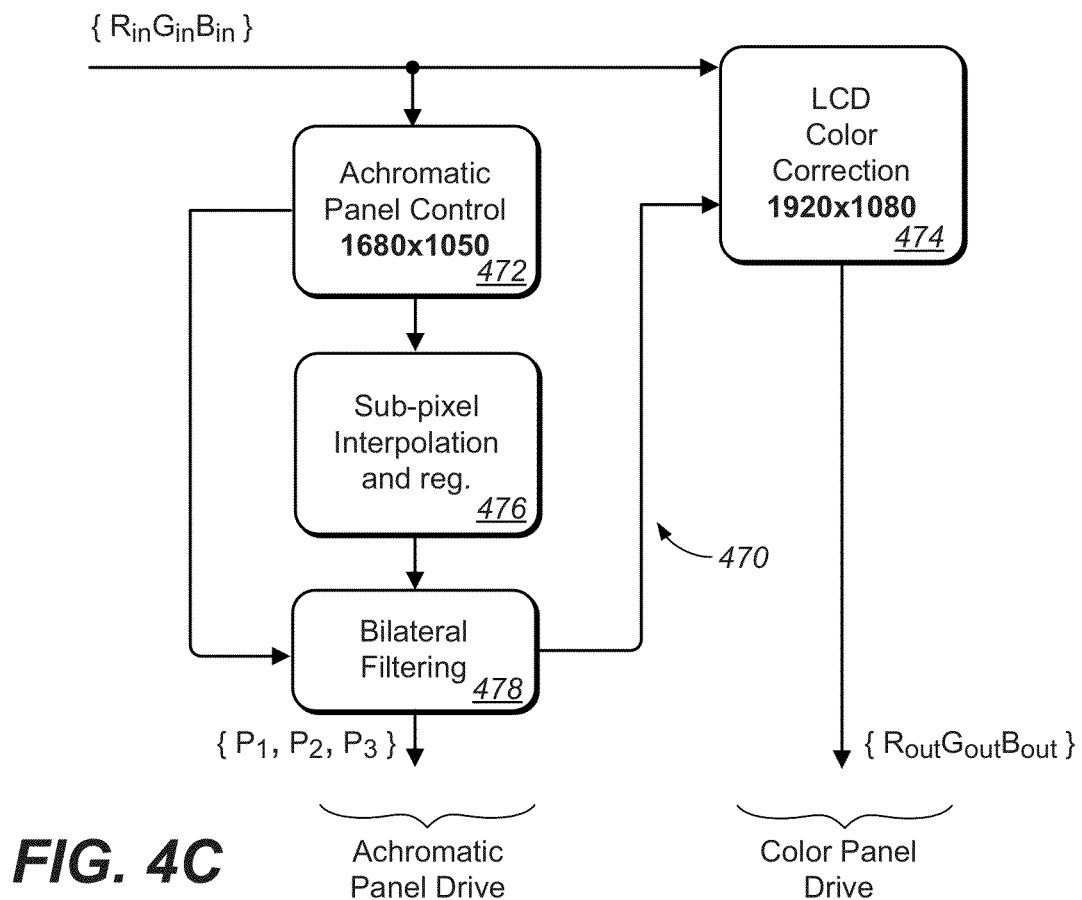

FIG. 4C is an architecture of controllers 470 according to an embodiment of the present invention. A $R_{in} G_{in} B_{in}$ signal is provided to both a Polarization Control Module 472 and an LCD Color Correction Module 474. The LCD Color Correction Module may be configured to correct and produce an output for a 1920×1080 array of RGB pixels. The Polarization Control Module may be configured to control other resolutions, for example, 1680×1050 polarization cells.

The Polarization Control Module outputs to each of: the LCD Color Correction Module, a sub-pixel Interpolation and Registration module 476, and a filtering module 478. The sub-pixel interpolation module interpolates values for each pixel of the polarization control panel (e.g., each pixel may be considered a sub-pixel relative to the larger pixels of the image-generating panel). The interpolation and registration module allows the embodiment to handle multiple panels with different control resolutions and sizes. The spatial and range filtering module allows us to smooth the energization on the contrast-improving panel to get better viewing angle performance while maintaining edges and preserving the high frequency details in the image. This module also enhances the local contrast of this embodiment.

Filtering is performed based on the polarization control and preceding sub-pixel operations. The result is a P1, P2, and P3 output for controlling the controllable polarizer, and an output for controlling the color panel.

Figure 4D:
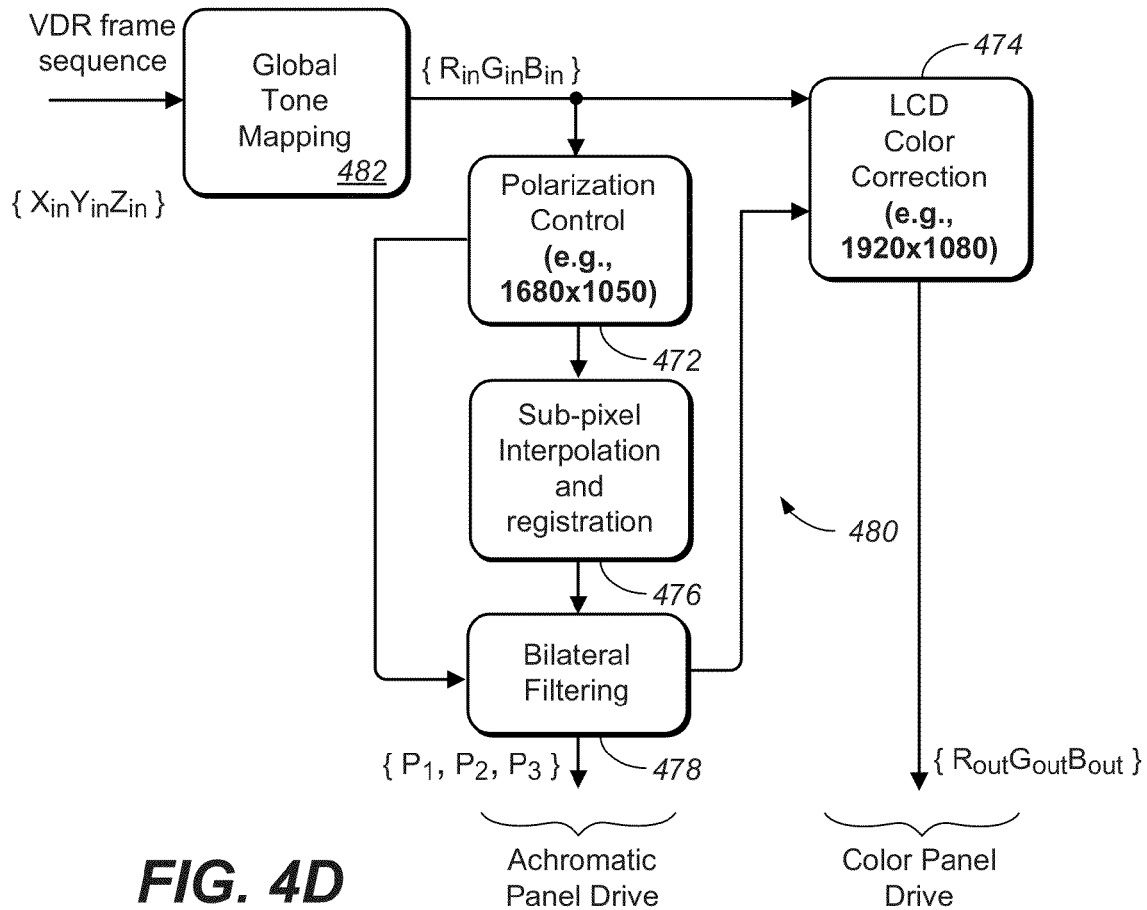

FIG. 4D is an architecture of controllers 480 according to an embodiment of the present invention that provides a framework for utilization of a High Dynamic Range (HDR) signal. The HDR signal could comprise an image and/or images (e.g., video) having a dynamic range that is equivalent to the dynamic range of the human visual system (HVS) on average. Since, on average, the HVS has greater dynamic range than most displays, a tone mapping algorithm may be utilized to change the dynamic range of the image(s) or portions of the images so that they are within luminance range of the proposed display system. An HDR frame sequence $\{X_{in}, Y_{in}, Z_{in}\}$ is provided to a Global Tone Mapping Module 482, which outputs an RGB signal which is then fed to Polarization Control 472 and LCD Color Correction Modules 474.

Figure 5:
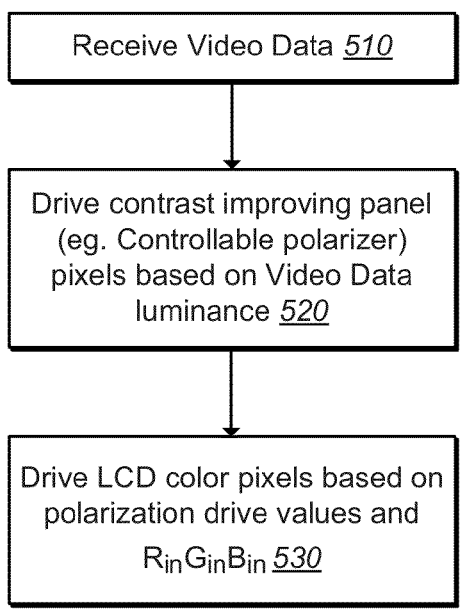
FIG. 5 is a flow chart of a process for energizing a high dynamic range display according to various embodiments of the present invention.

FIG. 5 is a flow chart of a process for energizing a high dynamic range display according to various embodiments of the present invention. At step 510 Image and/or video data (the method repeated in real time for each frame) is received. Luminance values are extracted from the image data and used to drive a contrast-improving panel (see step 520). An image-generating panel optically co-joined with the contrast-improving panel is driven based on the image data and the global or local dimming levels (step 530), or constant values representing the backlight color.

More details on a specific algorithm for driving the contrast-improving and image-generating panels are now discussed for producing a pixel accurate dual modulation displays. The architecture of two modulators of perhaps similar construction allows performance of local dimming in a sub-pixel (or higher resolution) fashion. Additionally, one of the modulators could have a different or the same resolution than the other in either dimension.

Pixels in the contrast-improving panel can be driven based on the luminance of a corresponding (or related) input pixel. The contrast-improving pixel may be a sub-pixel of an input pixel, a portion of an input pixel, or a pixel optically and precisely corresponding to an input pixel. Accurate characterization of the local dimming panel's output luminance response could be used to map the input RGB pixel values to a specific drive level (e.g., specific polarization rotation in this example).

Drive values may be provided, for example, via:

$$Y_{max} = Y_R + Y_G Y_B$$

$$Y_{out} = Y_R * R_{in} + Y_G * G_{in} + Y_B * B_{in}$$

$$\text{drive}_{polarizer} = f_2(f_1(Y_{out}/Y_{max}))$$

The function $f_1$ is the polynomial characterizing the luminance response of the combined dual modulation system while linearly varying the local dimming panel's (polarizer's) control with the RGB color LCD drive is set to full white (maximum codewords).

The function $f_2$ a nonlinear transfer function that could represent the skew of the codewords with the luminance representing the nonlinear nature of the drive. The function could be approximated with either a simple gamma curve or a polynomial function. This drive computation can be used to calculate the drive for pixels of the contrast-improving panel (sub-pixels (P1, P2, P3) of input pixels in the case where the contrast-improving panel has a similar construction and orientation to the image-generating panel). This function could also be used to improve the local contrast of the display using a nonlinear input-output relationship making dark regions darker and bright regions brighter.

The interaction between the image-generating panel and the contrast-improving panel (e.g., controllable polarizer) is represented in the color correction function. This function may utilize, for example, surfaces mapped from the characterization of the color primaries of the image-generating panel with the corresponding amount of local dimming (e.g., polarization) from the contrast-improving panel.

The resulting RGB drive may, for example, be calculated as follows:

$$R_{out} = f_3(R_{in}, f_4(R_{in}, Y_{out}))$$

$$G_{out} = f_5(G_{in}, f_6(G_{in}, Y_{out}))$$

$$B_{out} = f_7(B_{in}, f_8(B_{in}, Y_{out}))$$

Here, $f_4$, $f_6$ and $f_8$ define the characterization functions that define the output primary for an input primary pixel values and a computed $Y_{out}$. $f_3$, $f_5$ and $f_7$ define the nonlinear combination functions for combining the input primary and the output from the characterization functions.

The polarization control could be pre-computed in the LCD correction system to drive the LCD control plane independent of the polarization control signals computed in the dimming plane drive.

Sub-pixel control of the contrast-improving panel can be used to smooth out any parallax errors that are incurred by its use. Since sub-pixel control increases the implied resolution of the local dimming panel (e.g., polarizer), smoothing/dithering operations shall be more refined and accurate. By using a smoothing mask on the drive image to the modulating polarizer, such as, for example:

$$[\text{drive}_{polarizer}](i,j) = f_{int\,R}(\text{drive}_{polarizer}](i,j))$$

where $f_{int}$ is the smoothing operator applied on a spatial radius of R sub-pixels. In a construction with 4 sub-pixels on the polarizer corresponding to every pixel on the color RGB LCD, the applied quad design would increase the resolution of the contrast-improving panel to twice that of the image-generating panel along both the width and the height directions.

In an embodiment, a source image may be processed through a nonlinear function to modulate the contrast-improving panel. This can create a perceived effect of contrast stretching. Existing tone mapping algorithms rely exclusively on software algorithms to stretch contrast. By using, for example, a design such as shown in FIG. 1, with the algorithmic elements described above, contrast stretching without tone mapping or other contrast synthesis may be achieved.

The present invention also may be utilized for maintaining constant gamut over a wide range of luminance values. An expected representation of the chromaticity (x, y) for different luminance values follows a surface outlined the first drawing. However, the measured luminance of a standard display at the maximum codewords for the primaries creates an inclined top triangle as outlined in the first drawing.

However, some display systems demonstrate a gamut limiting effect as described by the bottom figure. The projection of the color gamut onto the chromaticity axes (x, y) is reduced in area for higher luminance values until it reduces to a single point at maximum drive values for the individual color primaries (R=G=B=1.0 in normalized drive values). This point is usually the white point of the system.

Figure 6:
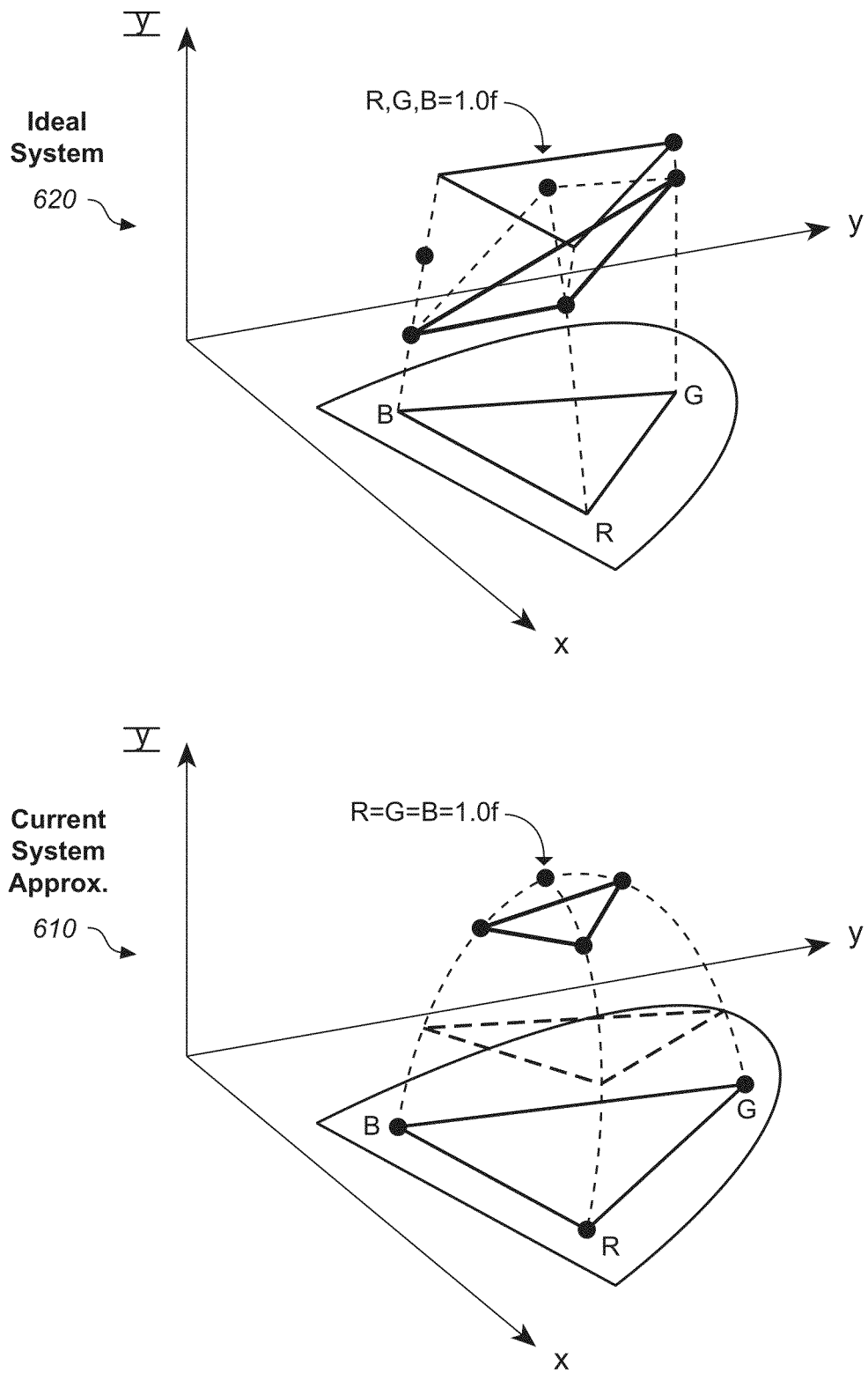
FIG. 6 is an illustration that compares the color processing of an ideal system and one possible embodiment of a display system as made in accordance with the principles of the present invention.

By using a non-uniform current drive for the 3 primaries, the maximum input codewords for the individual primaries can give us a flat-topped triangle at the higher luminance levels thereby increasing the color gamut and making the system demonstrate a more uniform projection on the chromaticity plane at higher luminance values. For example, FIG. 6 illustrates a comparison of a current display system 610 of the present invention and an "ideal" system 620.

The present invention includes the use of RGB individually controlled tristimulus based backlights (e.g., LEDs, arranged in, for example, an edge lit configuration, direct lit array, or other arrangement). By scaling the current drives to the RGB individually controlled tristimulus LED backlight, the 3D surface of the luminance vs. chromaticity of colors that represented may be adjusted. Luminance control is primarily from the dimming plane and the combination of the LED backlight and the dimming plane, scaling the color drives to the LEDs allows for wider color gamut at higher luminance values. For a target display luminance, the luminance vs. current characterization curves may be used to determine/create the right scaling parameters for a current drive designed for better control of color gamut at that target luminance. This forms a basis for a global backlight controller embodiment.

The global backlight controller embodiment can be used, for example, on a plurality of LEDs which are closely spaced to create an edge lit zonal dimming backlight on conjunction with the color LCD and the dimming plane. By working on a plurality of LEDs at a time, the global backlight controller embodiment can also be used for correcting drifts in the output wavelength of light from a zone with luminance and maintain more accurate color properties at higher wavelengths.

The present invention includes computation of a color primary rotation matrix from a sparse data set. Given a sparse set of tristimulus primaries (R, G, B) as input images to the display system and their corresponding luminance (Y) and chromaticity coordinates (x, y), it is possible to arrive at the optimum color rotation matrix for converting the RGB values to their corresponding XYZ values on the concerned display in the following manner:

$$A = [P1 P2 P3 \ldots Pn]^T$$

where $P_x = [R\ G\ B]_x$ for the x input sample primaries $$B = [M1 M2 M3 \ldots Mn]^T$$

where $M_x = [X\ Y\ Z]_x$ for the x output luminance/chromaticity

For example, let the color rotation matrix be:

$$X = \begin{bmatrix} RX & RY & RZ \\ GX & GY & GZ \\ BX & BY & BZ \end{bmatrix}$$

This could be expressed as a linear system of equations of the form:

$$Ax = B$$

and compute the rotation matrix x using the pseudo-inverse as:

$$x = (A^T A)^{-1} A^T B$$

This computed color rotation matrix would be optimized for minimum least square color distorting in the XYZ space given the number of sample data points that have been captured. Given more uniformly spaced data points, the computed color rotation matrix would be a more accurate representation of the true rotation operation by the display.

The present invention includes extending viewing angles in multi-modulated display systems. The use of existing LCD panels without red, green or blue color filters allows for much greater resolution of contrast enhancement as used as a background or foreground panel with another panel. This extra resolution becomes even more important when these dimming panels are coupled with different resolution color LCD panels or with similar scaled color LCD panels, as it allows for adjustable viewing angles across the display with minimized visual artifacts.

In the case where the base panel has the pixels (e.g., sub-pixels compared to other modulators in the same image chain) in clusters of four in a square configuration (2×2), even greater control is possible as this doubles the pixel/sub-pixel resolution in both horizontal and vertical directions. Existing image processing techniques for image scaling can be applied to these sub-pixel dimming regions if treated as individual control points, allowing for variable viewing angles and distances. To widen viewing angles as to accommodate multiple simultaneous viewers, a Gaussian or similar low pass filter can be applied as indicated by the spatial and range filtering embodiment in FIG. 4D.

The present invention includes controlling backlights for constant color. Traditional methods for setting display backlight light levels and color involve selecting from a set of voltage or current levels that drive the light. These do not factor in the changes to the color or luminance due to component or environmental temperatures, component age, or other factors. Our method of backlight control involves sending to the display a target color and luminance (usually with a scaled RGB target value), which is then compared with the values coming from a calibrated light and color sensor that is directly coupled with the backlight, with corrections made using a feedback loop. This eliminates the warm-up time for the display to settle to a particular color, and any color or brightness drift over time. This feedback process can be accelerated by using a feed-forward feedback hybrid driver (for the purpose of real-time backlight changes). This allows the backlight to instantly respond to control changes while still maintaining the precision maintained by the color and light sensors.

Figure 7A:
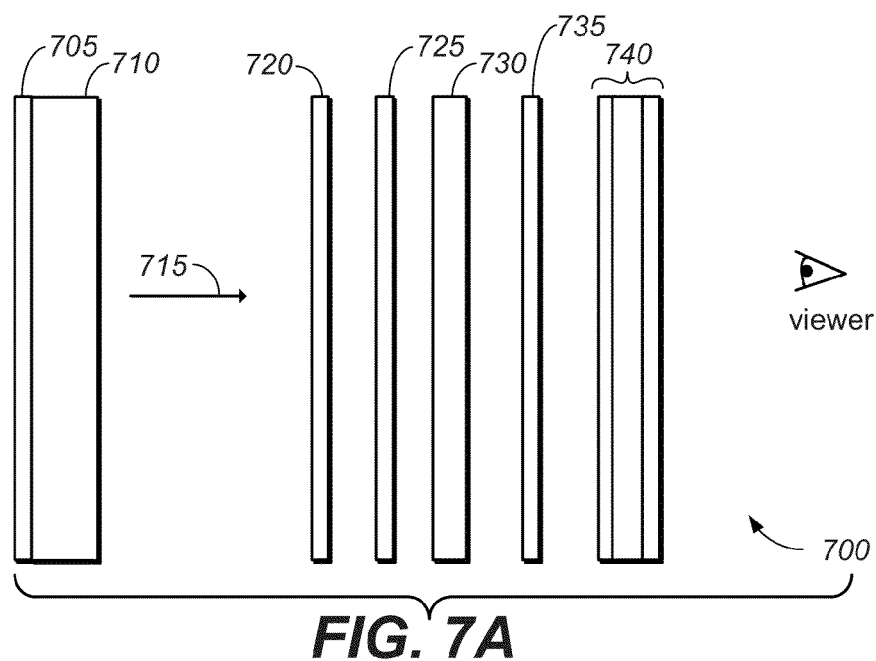
FIG. 7A is an arrangement of controllable panels according to an embodiment of the present invention.

The present invention may be implemented in a number of forms including combinations of hardware and processes described here and above. Another exemplary embodiment of a display device according to an embodiment of the invention is illustrated in FIG. 7A. A backlight 705 includes a reflective polarizer 710 that produces backlight 715. The reflective polarizer reflects and polarizes light that is directed toward the backlight's reflective polarizing surface(s). Such reflections include light that has been bounced back to the backlight from a reflective polarizer 725 because it was not of the desired orientation for further downstream processing by the display. Further reflection by the reflective polarizer changes the reflected lights polarization providing it another opportunity to pass the reflective polarizer 725 and be utilized in production of a desired image.

A diffuser stack 720 smoothes and diffuses the backlight 715, and the reflective or other type of polarizer passes light of a desired initial polarization for further downstream processing. A contrast-improving panel 730 (e.g., controllable "sub-pixel" polarizer—again "sub-pixel" because the pixels of the contrast-improving panel may be of higher resolution than its corresponding (e.g., downstream) image-generating panel) either locally dims or further locally dims (further locally dims in the case where backlight 710 is itself locally dimmed) light in the image/light chain from backlight to viewer. A diffuser stack 735 diffuses the locally dimmed light, and an image-generating panel 740 (e.g., LCD panel) imparts final modulation (e.g., color, brightness, and spatial resolution) into the light, which is then emitted for display to a viewer. A polarizer (usually absorptive) is included in front of the image-generating panel to realize the modulation imparted by the color panel. Additional anti-glare or other light processing layers may be present in front of the image-generating panel.

Figure 7B:
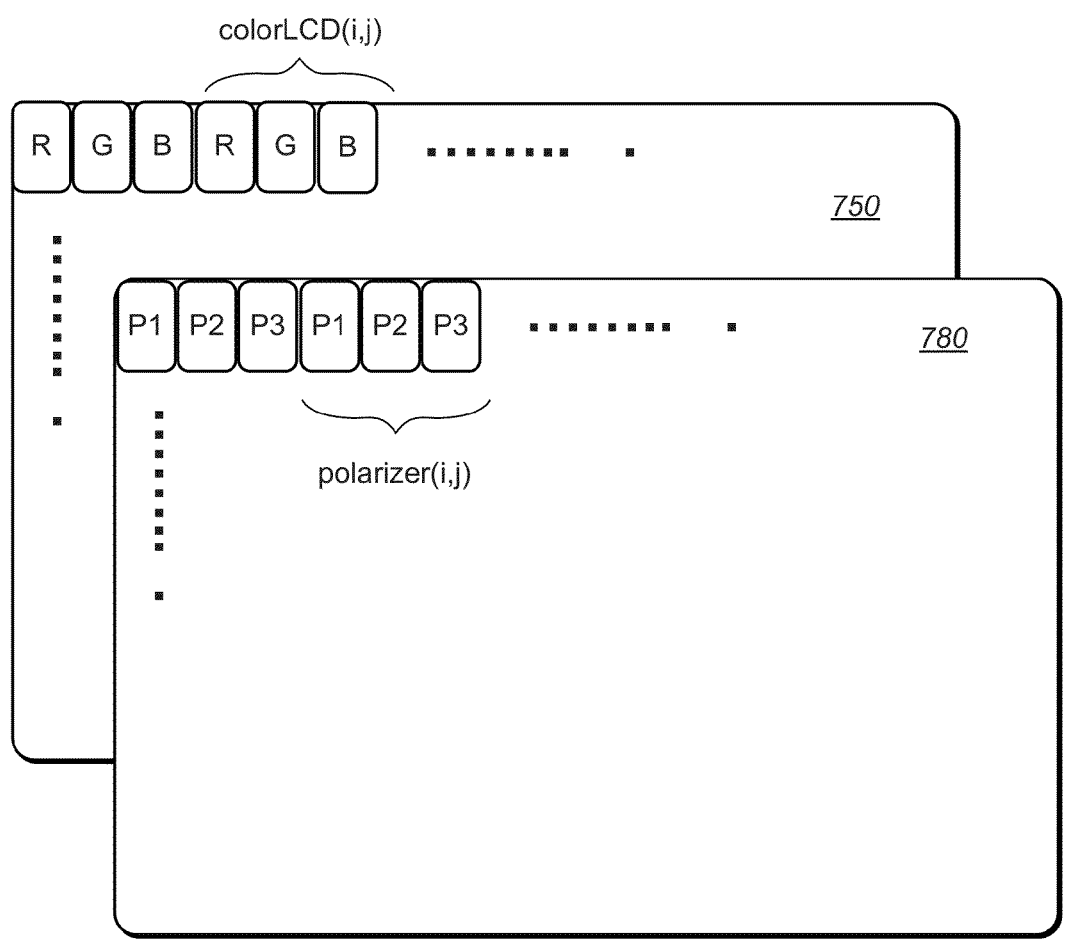
FIG. 7B is an arrangement of pixels on panels according to an embodiment of the present invention.

The discussion on pixels is now elaborated with reference to FIG. 7B which provides a diagram illustrating a possible relationship between pixels of an image-generating panel and pixels of a contrast-improving panel. An image-generating panel 750 includes sets of Red, Green and Blue (RGB) controllable elements each comprising a pixel of the color panel. For example, one pixel is defined as colorLCD(i,j), where I and j identify, for example, a row and column position of the pixel or RGB triad comprising the pixel. In this case, a similar location may be identified in the contrast-improving panel 780, where a set of three pixels corresponding to the RGB triad of colorLCD(i,j), P1, P2, and P3 of a group of local dimming pixels identified as polarizer(i,j) (however, P1, P2, and P3 may also be appropriately referred to as sub-pixels as they optically correspond to (or modulate) sub-pixel regions of the colorLCD pixels).

The present invention includes the use of modulators having different resolutions. In such cases it may not be possible to align pixels of the color and dimming panels as illustrated in FIG. 7B (however, alignment is not necessarily the case even when there is a direct correspondence between the size and arrangement between pixels of the local dimming panel and pixels of the color panel). Still, the pixels of the contrast-improving panel may be referenced as pixels of the contrast-improving panel or as sub-pixels of the color panel when they are of smaller size or greater resolution than the color panel pixels, which they jointly modulate to produce an image.

The invention may be further extended to displays with additional modulators. For example, a display with 3 modulating panels and techniques for driving the panels. By placing an additional controllable polarizer in front of the design discussed and illustrated in FIG. 7A, light at an output of the display could be steered at different polarization angles, ether in a linear or circular manner. By using this system in conjunction with 3D polarized glasses, it is possible to steer the objects on the display to either left or right eyes based on the modulation drive for the 3rd polarization panel. This stereoscopic-driving layer can be driven in various means using spatial, temporal, or color based stereoscopic methods alongside traditional two-dimensional content, alone or simultaneously.

Figure 8:
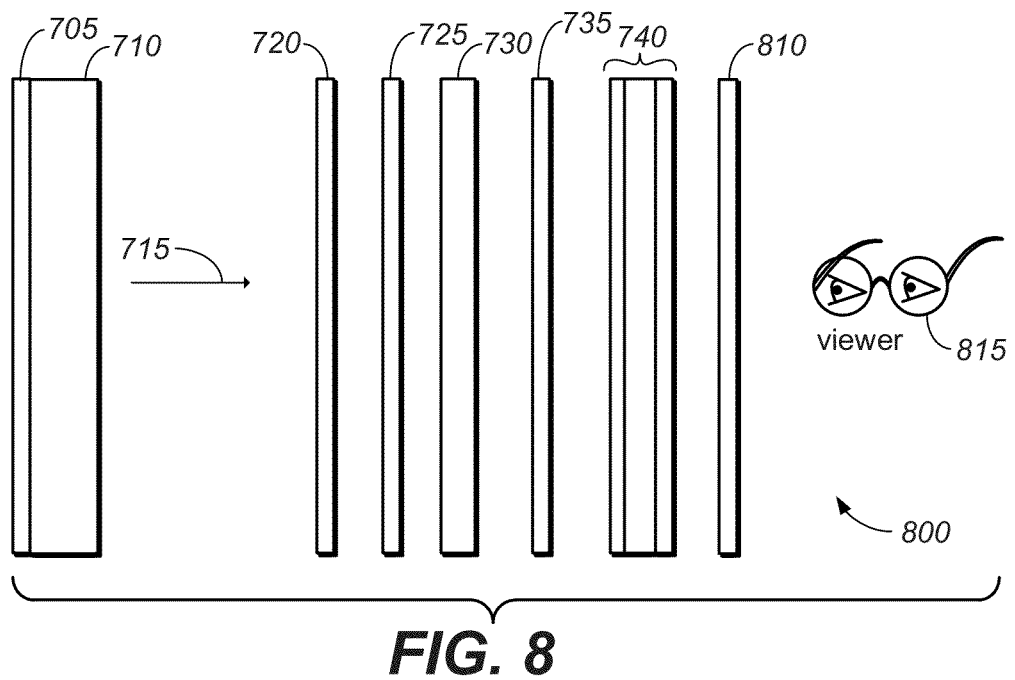
FIG. 8 is an arrangement of controllable panels according to various embodiments, including simultaneous 2D and 3D displays, of the present invention.

In FIG. 8, a display 800 includes all of the proposed parts associated with the FIG. 7A embodiment, with an additional controllable panel 810. The additional controllable panel may be, for example, a controllable polarizer similar in construction to the exemplary controllable polarizer described with respect to local dimming panel 730. However, here the panel is controlled to output images for respective channels. The channels may be, for example, a left eye viewing channel or a right eye viewing channel that may be separated for viewing by viewing glasses 815 that include different filters for the left eye and right eye.

For example, display 800 could be energized to alternately display a left view and a right view of a 3D image. The images would then be separated into different corresponding viewing channels by energizing the additional controllable polarizer to polarize each of the images consistent with its viewing channel. For example, in a left and right polarization viewing system, the glasses 815 could be constructed to include a P polarization filter on the left eye lens and an S polarization filter on the right eye lens. In such a case, controllable panel 810 is energized to pass/convert light modulated with left image data to a P polarization and pass/convert light modulated with right image data to S polarization. In another example, the light may modulated with left or right image data in sections (e.g., light being emitted from the display at any given time contains parts of both a left and right channel image), and the controllable polarizer panel is also energized in sections and synchronized with the displayed image sections to convert those sectional images to the appropriate polarization and subsequent viewing through polarized filters by the left and right viewing channels.

Beyond 3D, the configuration of FIG. 8 allows the design to be extended to either more color accurate HDR or a 3D HDR display system. In conjunction with a method to drive the accurate compensate for color performance in 2D and 3D modes, a passive 3D display results. In addition, a hybrid 2D/3D display may be implemented (either driving the additional modulator for 3D channel separation, or to further refine a 2D image). To create a quality image, color and brightness correction may be performed over the total image areas. The display can be switchable between 2D and 3D operations, and can be configured to simultaneously drive 3D and 2D on the same screen. As 3D images are split between two eyes, they tend to be less bright. Additional color filters can be applied to the 2D image areas so that both 3D and 2D areas appear as the same brightness. Possible color correction can be applied as well.

Figure 9:
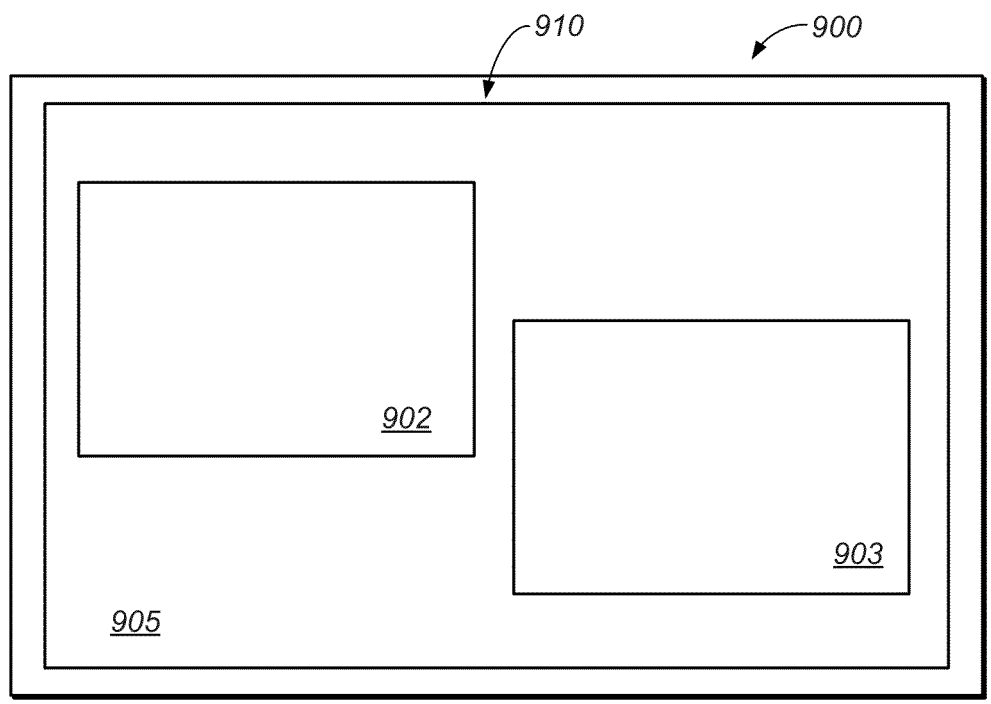
FIG. 9 is a drawing of one possible embodiment of a simultaneous 2D and 3D display according to the present invention.

In one embodiment, the additional controllable panel 810 is utilized for both 2D and 3D displays, and for providing a completely black border around the simultaneously displayed 2D and 3D images. As shown in FIG. 9, a display 900 is energized to render an image on panel 910—providing a 2D display area 902 and 3D display area 903 on the panel's viewing area 905. In the 2D display area 902, the additional controllable panel 810 is utilized to enhance the dynamic range and black levels of the 2D display. Simultaneously, in the 3D display area 903, the additional controllable panel 810 is utilized to steer polarization of the left or right channel image being displayed to a polarization consistent with the corresponding left or right viewing channel. Finally, in border areas surrounding the 2D and 3D display areas, the additional controllable panel 810 is utilized to increase blackness (e.g., making a black boarder darker) or otherwise enhance the border area.

Variances in any particular 3D implementation may include, for example, a mix of shutter styles, per pixel steering, and brightest area chroma-based techniques, alongside 2D images as well. For example, for shutter style, one embodiment alternatively displays left and right images with steering of entire image to left or right eye with polarization layer (albeit at a reduced, or ½ frame rate). For a pixel steering embodiment, where left and right images differ, steering may be performed at alternate pixels to one eye or the other (albeit at a reduced, ½ resolution per image). In a brightest area embodiment, each pixel from both eye's images you find the highest luminance, then using the delta luminance between the two images steer the right light proportion to both eyes (albeit at a reduction of color resolution in the dimmer channel).

Some Image Processing Embodiments

Some embodiments of the invention include computation of a color primary rotation matrix from a sparse measured data set. Given a sparse set of tristimulus primaries (R, G, B) as input images to the display system, a color rotation matrix (e.g., an optimum color rotation matrix) is determined for converting each trio of input RGB values in the sparse set to a corresponding set of drive values (XYZ) for the color LCD panel of the display. The matrix could be predetermined, then implemented as a look-up table (LUT), and then used during a display drive value operation to generate a set of drive values for the color LCD panel of a display in response to a set of input RGB values (and achromatic panel drive values determined from the input RGB values). For example, the operation of reading (from the LUT) a set of drive values for the color LCD panel in response to a set of input RGB values (and achromatic panel drive values determined therefrom) could be equivalent to multiplication (of the inputs to the LUT) by the rotation matrix.

The computed color rotation matrix could be implemented by module 474 of FIG. 4C or 4D, or by controller module 410 of FIG. 4A, or by controller module 462 of FIG. 4B, or by LUT 1020 of FIG. 10, to be described below, and is preferably optimized for minimum least square color distortion in the output color space given the number of sample data points that have been measured to determine the matrix. Given more uniformly spaced data points, the computed color rotation matrix would be a more accurate representation of the true rotation operation by the display.

The color rotation matrix may be determined as a result of preliminary measurements on the display in which the display is backlit (e.g., with a constant, known backlight) and driven by a sparse set of input color value trios ($R_{in}$, $G_{in}$, and $B_{in}$), and a trio of achromatic panel drive values (P1, P2, and P3) determined from each trio of input color values, and the actual color emitted by the display in response to each trio of input color values ($R_{in}$, $G_{in}$, $B_{in}$) and the corresponding set of achromatic panel drive values (P1, P2, P3) is measured and compared to a target (desired) set of colors in response to said set of input color values and corresponding achromatic panel drive value set. As a result of the measurements, the color rotation matrix can be determined to be a matrix which, when matrix-multiplied with a vector whose coefficients are an input color value trio ($R_{in}$, $G_{in}$, and $B_{in}$) and a corresponding trio of achromatic panel drive values (P1, P2, and P3), will determine corrected color LCD panel drive values ($R_{out}$, $G_{out}$, and $B_{out}$) and achromatic panel drive values (P1, P2, and P3) which will drive the display to display the target color determined by the input color value trio ($R_{in}$, $G_{in}$, and $B_{in}$).

A set of color panel drive values ($R_{out}$, $G_{out}$, and $B_{out}$) determined by the color rotation matrix in response to each of a full set of input color value trios ($R_{in}$, $G_{in}$, $B_{in}$) and trio of achromatic panel drive values (P1, P2, and P3) determined by each input color value trio, can be stored in a color drive LUT. The color drive LUT could be implemented in module 474 of FIG. 4C or 4D, or by controller module 410 of FIG. 4A, or by controller module 462 of FIG. 4B, or by LUT 1020 of FIG. 10. To produce the color drive LUT, a sparse set of the corrected color panel drive values could be determined (from a sparse set of input image color value trios and corresponding achromatic panel drive value trios) and then interpolation could be performed thereon to generate a full set of corrected color panel drive values (e.g., including a trio of output color panel drive values, ($R_{out}$, $G_{out}$, and $B_{out}$), for each possible set of input color values $R_{in}$, $G_{in}$, and $B_{in}$), and the full set could then be loaded into the color drive LUT.

In other embodiments of the inventive display, color panel drive values are generated or provided (e.g., computed on the fly by matrix multiplication) in response to the input image pixels, in a manner other than being read from a color drive LUT.

Figure 10:
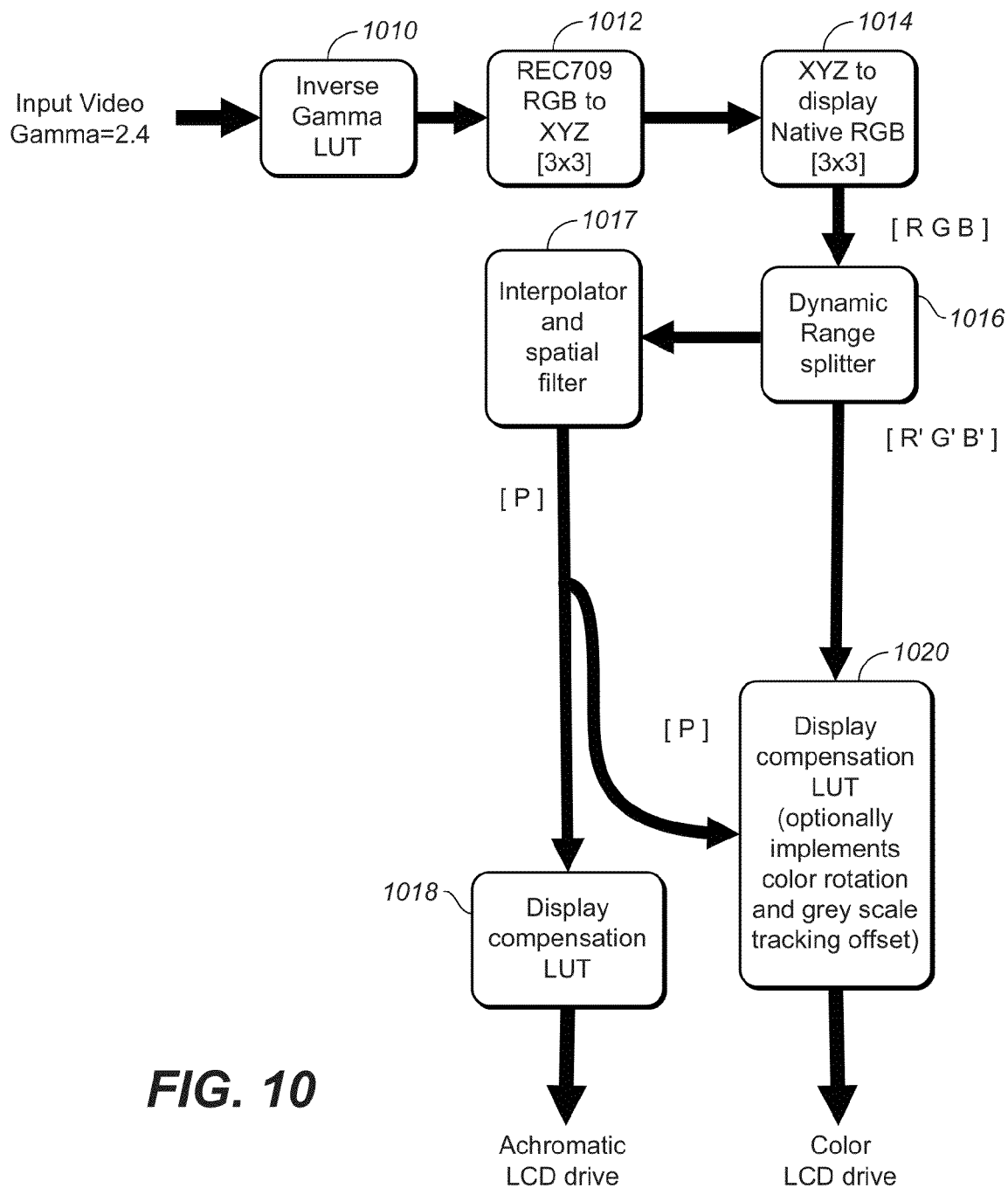
FIGS. 10 and 11 illustrate various embodiments of a controller that generates drive signals for a color LCD panel and an achromatic LCD panel of a dual LCD panel display.

FIG. 10 is a block diagram of a controller that generates drive signals for a color LCD panel and an achromatic LCD panel of a dual LCD panel display (e.g., the LCD panels of the FIG. 1A, 1B, 2A, or 3B display) according to another embodiment of the present invention.

The FIG. 10 embodiment of the inventive controller is preferably implemented to generate drive values for the achromatic LCD panel and color LCD panel of a dual LCD panel display in response to input image pixels (each input image pixel determined by a trio of color values $R_{in}$, $G_{in}$, and $B_{in}$), in accordance with a modular forward model (to be described below), assuming that the achromatic LCD panel and color LCD panel have the same resolution and size (so that each pixel of the achromatic panel is aligned with a pixel of the color panel. The FIG. 10 controller performs operations (and the forward model assumes that operations are performed) on a per pixel basis, and generates a single achromatic drive value (P1=P2=P3=P) for each pixel of the achromatic LCD panel, so that (where each pixel of the achromatic LCD panel comprises three cells) each cell of the achromatic LCD panel's pixel is driven by the same achromatic drive signal (P1=P2=P3=P). The preferred method performed by the FIG. 5 controller to generate drive values for the achromatic LCD panel and color LCD panel is sometimes referred to as the "4Deep" algorithm, with "4Deep" referring to the four drive values needed to drive each pixel of the dual LCD panel display's color LCD panel (the three color components of the pixel are modulated in response to three color panel drive values or signals, $R_{out}$, $G_{out}$, and $B_{out}$) and the achromatic LCD panel pixel that is aligned therewith (a fourth drive value or signal, P, is employed to modulate this achromatic panel pixel). The 4Deep algorithm performs the same operations on the all the pixels in the input image. This makes it well suited for GPU based massively parallel computing architectures.

The fundamental problem solved by the 4Deep algorithm is: for a given input video signal (an RGB signal indicative of Red, Green, and Blue values for each pixel of each image (frame) to be displayed), what is the optimal set of drives to the achromatic LCD panel and color LCD panel of the display for accurate reproduction of motion imagery. In accordance with the algorithm, the input video signal is indicative of pixels in the display's native [RGB] color space. Thus, when implemented by the FIG. 10 system, the input signal to dynamic range splitter module 1016 is a sequence of pixels (each determined by a trio of color values ($R_{in}$, $G_{in}$, $B_{in}$) in the display's native color space.

Preliminary processing is performed on the input image signal in elements 1010, 1012, and 1014 of the FIG. 10 system. Each of elements 1010, 1012, and 1014 is implemented as a look-up table (LUT). In variations on the FIG. 10 system, elements 1010, 1012, and 1014 (or elements 1012 and 1014) are omitted and the input image signal is asserted directly to the input of module 1016 (or where LUT 1010 is present, the output of LUT 1010 is asserted directly to the input of module 1016).

In the case that the input image pixels determined by the input image signal are gamma-encoded (e.g., the input image has gamma equal to 2.4), inverse gamma LUT 1010 of FIG. 10 is used to transform the color components of the input image pixels to standard Rec. 709 RGB data. Such inverse gamma correction is typically necessary when elements 1012, 1014, 1016, 1018, and 1020 of the FIG. 10 system are implemented to require linear RGB input values (gamma correction transforms linear values to nonlinear values, e.g., to correct for nonlinearities in CRT monitors that will be used to display them, and inverse gamma correction transforms such nonlinear values to linear values).

The linear Rec. 709 RGB color values output from LUT 1010 are converted to normalized, linear CIE XYZ values (where Y denotes luminance) in LUT 1012. LUT 1012 effectively implements a standard 3×3 matrix transform (3×3 matrix multiplication) on each trio of Rec. 709 RGB color values asserted thereto.

The CIE XYZ color values output from LUT 1012 are converted to RGB values in the display's native color space in LUT 1014. LUT 1014 effectively implements a standard 3×3 matrix transform (3×3 matrix multiplication) on each trio of CIE XYZ values asserted thereto.

The two transformations from (linear) Rec. 709 RGB into XYZ space (in LUT 1012) and then from XYZ into (linear) native RGB color space (in LUT 1014) can be combined into a single transformation to avoid the need for two LUTs. Doing so would allow LUTs 1012 and 1014 to be replaced by a single LUT implementing a 3×3 matrix transform. In implementation this would be preferred as it reduces complexity.

An advantage of the FIG. 10 design (with separate LUTs 1012 and 1014) is that it allows a display driven by the FIG. 10 controller to be tested to verify the accuracy of the display, by computing target CIE XYZ values generated from input pixels (in LUT 1012), and comparing the target XYZ values directly against the display's output by measuring CIE XYZ values of the displayed light in the front of the display screen with a colorimeter. As the chromaticities of the display's native RGB primaries may be different than those for standard Rec. 709 RGB color space, the linear transformations by LUTs 1012 and 1014 (or a single LUT combining their transforms) will generally be necessary. However if the display's native RGB primaries are the same as Rec. 709 RGB primaries, the linear transformations would be unnecessary.

The input signal (in the display's native RGB color space) is indicative of a sequence of RGB values, including one red (R) value, one green (G) value, and one blue (B) value for each pixel of the display (i.e., each pixel of the color LCD panel and a pixel of the achromatic LCD panel that is aligned therewith).

In Dynamic Range Splitter module 1016 of FIG. 10, in response to each trio of RGB values (of the sequence of RGB values indicated by the input signal), a luminance value P' is generated as the square root of the maximum of the R, G, and B values. Drive signals for corresponding pixels of the achromatic LCD panel are generated (in elements 1017 and 1018) in response to the luminance values P' generated in module 1016. Dynamic Range Splitter module 1016 also normalizes each of the R, G, and B values in put thereto by dividing it by the P' value to generate normalized values R'=R/P', G'=G/P', and B'=B/P' (thereby using the full dynamic range of the RGB signal space to create the R', G', and B' values).

The resulting R', G', and B' values, and interpolated, filtered luminance values generated (in module 1017) in response to the P' values, are run through look up tables (LUTs) 1018 and 1020 to map them to achromatic panel and color panel drive values to generate the desired light output. Specifically, display compensation LUT 1018 outputs achromatic panel drive value PD in response to each interpolated, filtered luminance value from module 1017, and display compensation LUT 1020 outputs a trio of color panel drive values RD, GD, and BD (for one pixel of the color LCD panel) in response to each trio of R', G', and B' values from module 1016. The PD signal is replicated for all three sets of cells of the achromatic LCD panel (i.e., each PD value drives all three cells of the relevant pixel of the achromatic LCD panel).

The values stored in LUTs 1018 and 1020 are typically generated by characterizing the color and luminance response of the display. A typical characterization process includes steps of running the display through a sequence of inputs that vary in color and intensity. The output of the display is measured for each of these inputs (e.g., using a spectro-radiometer) and the measured values are interpolated (to estimate output values in response to other inputs) and the resulting values are processed (e.g., in a manner to be described below) to generate the full set of values that is stored in LUT 1018 and the full set of values that is stored in LUT 1020.

Since the achromatic LCD panel typically has higher resolution than the color LCD panel, interpolator and spatial filter module 1017 interpolates the luminance values P' output from module 1016 to generate a set of interpolated luminance values for each pixel of the achromatic LCD panel (each pixel of the achromatic LCD panel, driven by one of the interpolated luminance values or an achromatic panel drive value determined therefrom, may be referred to as a "sub-pixel" since it is smaller than the larger pixels of the color LCD panel, as noted above). The interpolation performed in module 1017 preferably allows the controller to drive different achromatic LCD panels with different control resolutions and sizes.

Interpolator and spatial filter module 1017 also implements spatial filtering (on the interpolated luminance values generated in module 1017) to diffuse the drive to the achromatic LCD panel to improve the off-angle viewing of the display, as there is no need for perfect, one-to-one alignment between the achromatic and color LCD pixels. The spatial filtering can smooth the energization of the achromatic LCD panel to achieve better viewing angle performance while maintaining edges and preserving the high frequency details in the displayed image. Module 1017 may implement "bilateral" spatial filtering in the sense that the filtering spreads an interpolated luminance value P (at one pixel of the achromatic panel) over a radially symmetric set of pixels around the pixel (e.g., with a Gaussian function). The spread for a low intensity input P is typically wider/broader (slower to decay) than the spread for a high intensity input P.

LUT 1020 implements dynamic color rotation to account (compensate) for variations in the color of light transmitted by the achromatic LCD panel (to the color LCD panel) based on the drive conditions of the achromatic LCD panel (assuming the achromatic LCD panel is positioned between the backlight and the color LCD panel) to improve accuracy of color reproduction of the display. The dynamic color rotation compensate for variations in the color of light transmitted by the achromatic LCD panel in response to input image pixels having different luminance values (the luminance values of the input image pixels determine the drive conditions of the achromatic LCD panel). The dynamic color rotation is "interpolated" color rotation in the sense that the values stored in LUT 1020 determine first color panel drive values for input image pixels having a minimum luminance, second color panel drive values for input image pixels having a maximum luminance, and color panel drive values (that are determined by interpolation from the first or second color panel drive values) for input image pixels having luminance between the minimum luminance and maximum luminance (as will be apparent from the following description of the forward model).

In variations on the FIG. 10 embodiment, LUT 1020 stores color panel drive values for input image pixels having a first luminance (e.g., the minimum luminance or the maximum luminance), and a processing module is employed to correct each value output from module 1016 (or each value output from LUT 1020) on the fly. The correction should ensure that the color panel drive values resulting from the uncorrected input to the processing module are corrected (color rotated) by amounts determined (using interpolation) by the difference between the actual luminance of the relevant input image pixel and the first luminance. The processing module should implement the same dynamic color correction (e.g., interpolated color rotation) that is implemented by LUT 1020 of FIG. 10.

Figure 11:
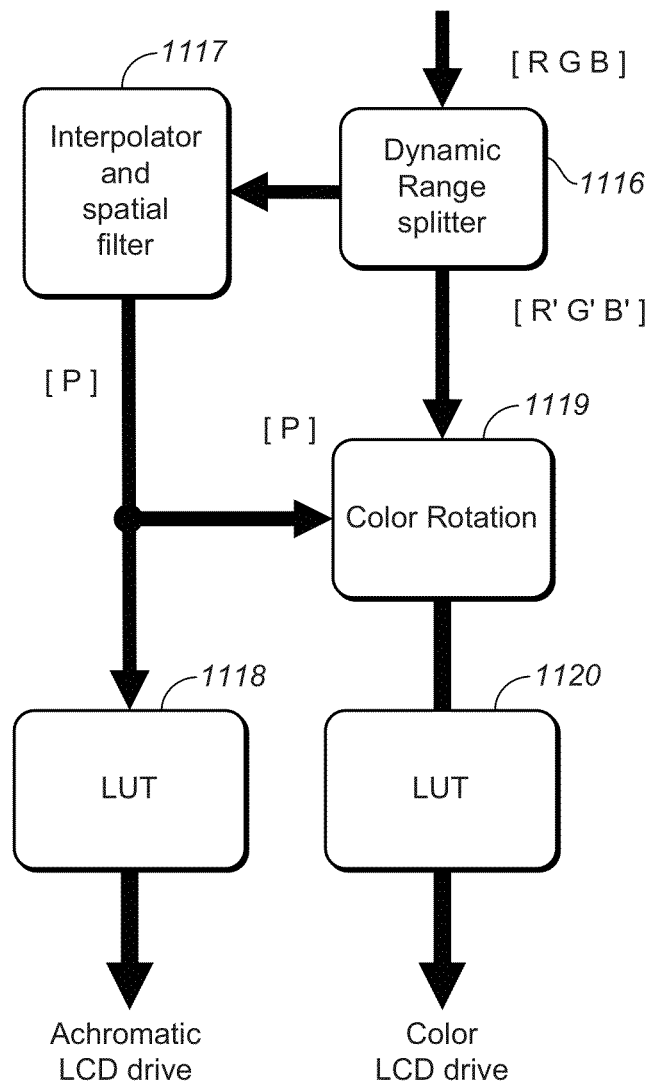

The FIG. 11 controller is an example of such a variation on the FIG. 10 embodiment. In FIG. 11, elements 1116, 1117, and 1118 may be identical to the identically numbered elements of FIG. 10, and the description of them will not be repeated. LUT 1120 of FIG. 11 stores color panel drive values for input image pixels having a first luminance (e.g., a minimum luminance), and processing module 1119 is configured to perform color rotation on each trio of normalized values R'=R/P', G'=G/P', and B'=B/P' output from module 1116 on the fly. The color rotation is performed, in response to the current luminance value P being asserted (to module 1119) from the output of element 1117, to replace each trio of uncorrected input values (from module 1116) by a color rotated (corrected) trio of RGB values. In response to the color rotated trio of RGB values, LUT 1120 of FIG. 11 outputs the same color panel drive values as LUT 1020 of FIG. 10 would output in response to the trio of uncorrected input values.

Implementations of the FIGS. 10 and 11 controllers which perform dynamic interpolated color rotation as described, are examples of a class of embodiments of the inventive controller in which the controller is configured to determine an achromatic panel drive value set and a color panel drive value set in response to each input image pixel of a sequence of input image pixels, and the controller is configured to perform interpolated color rotation to generate data determining the color panel drive value set, in response to said each input image pixel and at least one value determining the achromatic panel drive value set for said each input image pixel (e.g., a luminance value output from module 1017 or 1117 of FIG. 10 or 11), including by determining first color panel drive values for input image pixels having a first luminance, and generating corrected color components by color rotating color components of said each input image pixel by amounts determined by the difference between the actual luminance of said each input image pixel and the first luminance, and determining the color panel drive value set for said each input image pixel from the corrected input color components and the first color panel drive values.

LUT 1020 of FIG. 10 (or module 1119 of FIG. 11) is optionally implemented so that the dynamic color rotation performed thereby accounts also for minor color variations of the optical stack to a first order linear approximation as defined by the forward model described below, and optionally also so that it accounts for nonlinearity in the optical multiplication of the achromatic LCD panel and the color LCD panel (e.g., grey-scale tracking offset) to a second order approximation defined by the forward model.

The controller of FIG. 10 (or FIG. 11) performs the same operations on all the pixels in each input image. This makes it well suited for implementation with GPU based massively parallel computing architectures. The dynamic color correction performed by the controller of FIG. 10 or FIG. 11 (or by typical implementations of any of the noted variations on the FIG. 10 controller in which LUT 1020 stores color panel drive values for input image pixels having a minimum luminance, and a processing module is employed to correct each value output from module 16 or each value output from LUT 1020 on the fly) has low memory requirements and processing speed and complexity requirements. Typical implementations would require few operations (multiplication, division, square root, or table look up operations) per pixel.

It will now be described forward light models of a dual LCD display, which capture key colorimetric characteristics of such a display, and enable pixel-level algorithms for colorimetric control of configurations of such a display (in accordance with embodiments of the invention).

Figure 12:
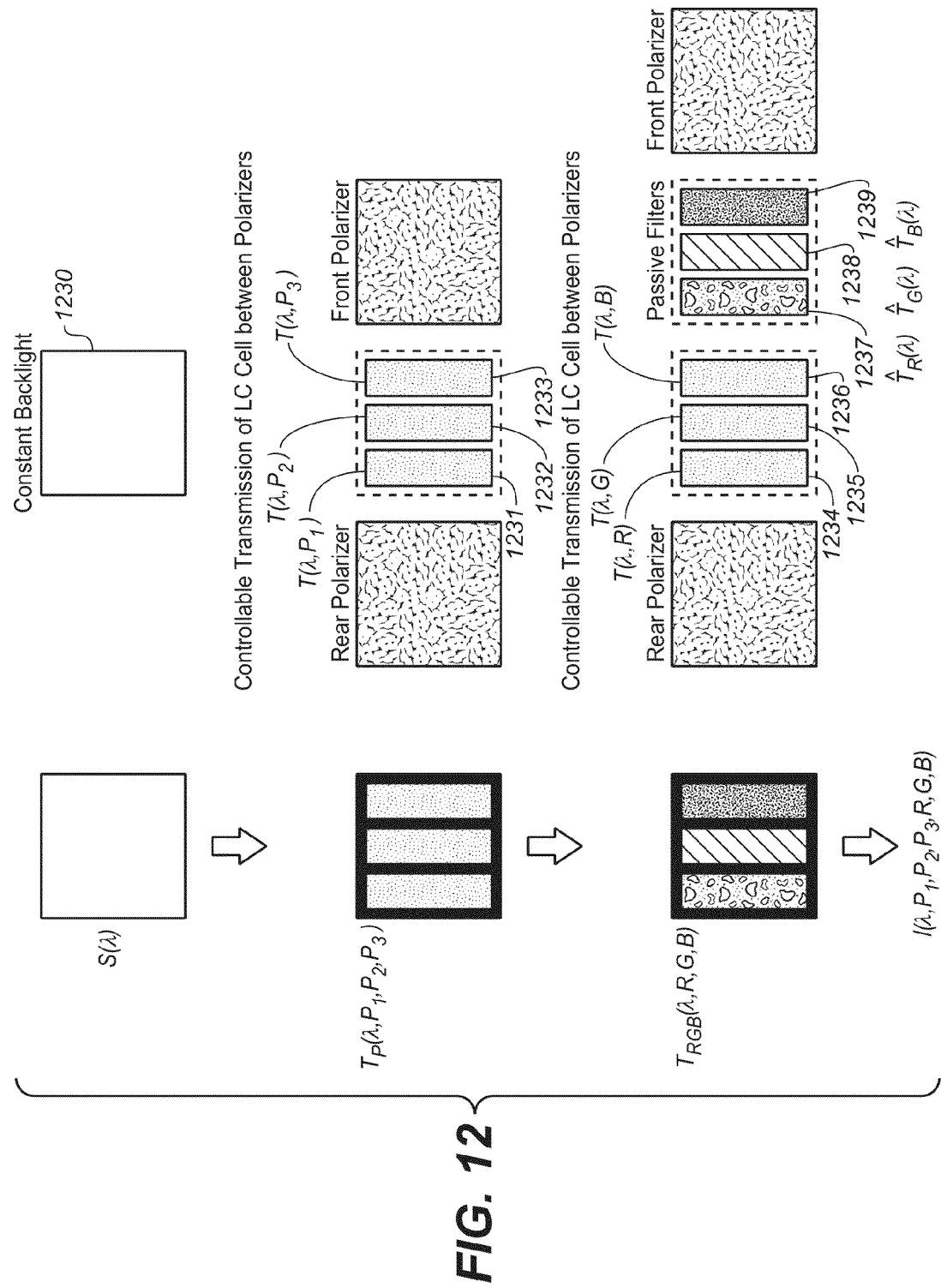
FIG. 12 is a diagram of elements of an embodiment of a dual LCD display comprising a monochromatic LCD panel and a color LCD.

The models assume a dual LCD display of the type shown in FIG. 12. FIG. 12 is a diagram of elements of an embodiment of a dual LCD display including a backlight (1230), an achromatic LCD panel positioned to be illuminated by backlight 1230, and a color LCD panel positioned to transmit light emitted from the achromatic LCD panel. The achromatic LCD panel comprises a rear polarizer, a front polarizer, and an array of LCD cells between the polarizers. Each pixel of the achromatic LCD panel comprises three LCD cells (1231, 1232, and 1233).

The color LCD panel comprises a rear polarizer, a front polarizer, an array of LCD cells between the polarizers, and an array of passive color filters between the LCD cell array and the front polarizer. Each pixel of the color LCD panel comprises three LCD cells (1234, 1235, and 1236), and a red color filter (1237) in front of LCD cell 1234, a green color filter (1238) in front of LCD cell 1235, and a blue color filter (1239) in front of LCD cell 1236.

Each color cell consists of the basic liquid crystal transmission cell (1234, 1235, or 1236) with a passive color filter. The effect of the passive color filter can be included by multiplying the simple transmission model by a static spectral transmission function for the color filter.

Figure 13:
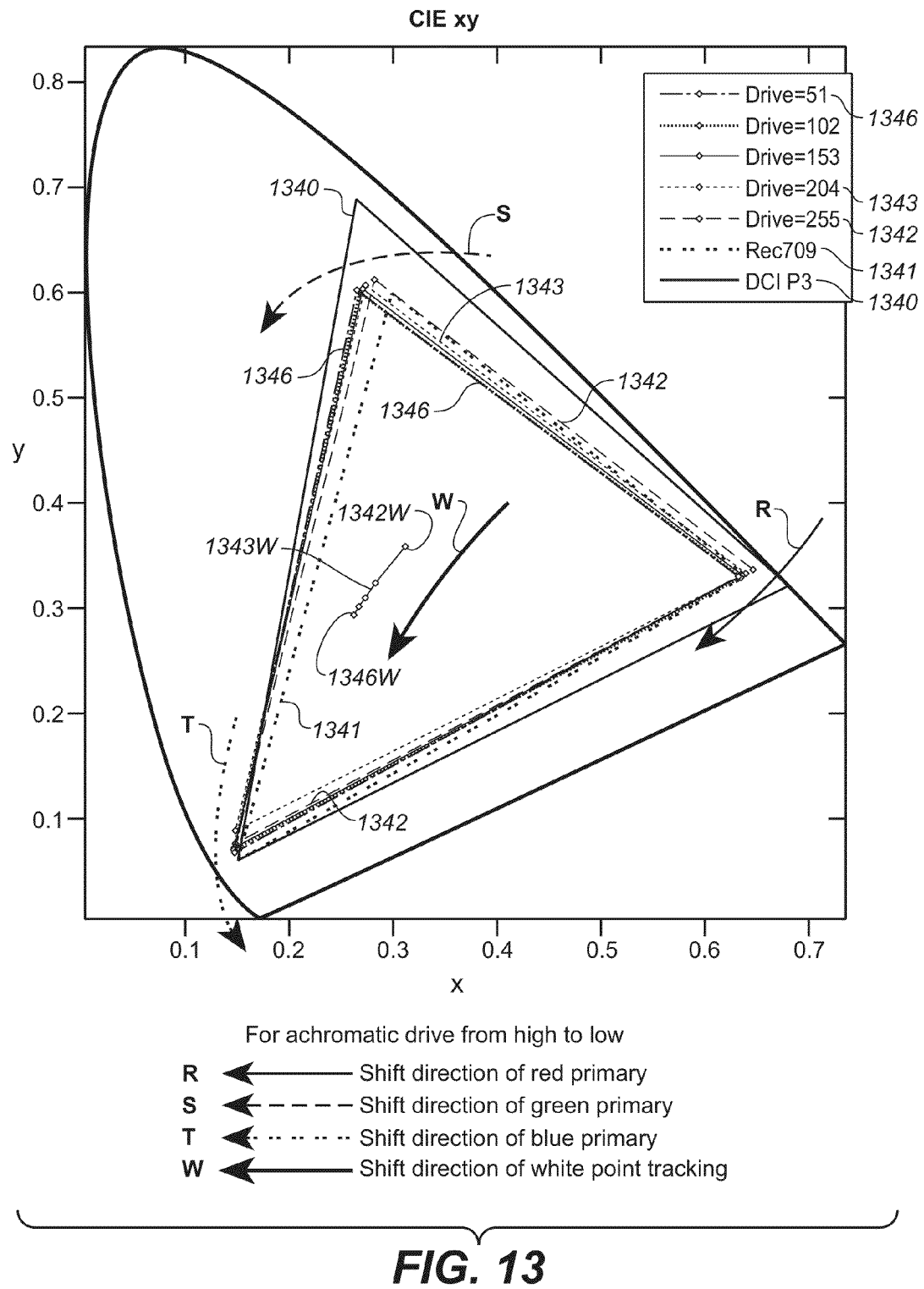
FIG. 13 illustrates the characteristics of the observed color shifts in chromaticities of the RGB color primaries as well as white point for the color LCD panel as a function of driving the achromatic LCD panel.

It may be noted that when a dual LCD display (of the type described with reference to FIG. 12) is driven with a constant set of drive values (RGB) to its color LCD panel but with a varying drive value (P) to each cell of each pixel of its achromatic LCD, there is a shift in the chromaticities of the resulting displayed images. FIG. 13 illustrates the characteristics of the observed color shifts in chromaticities of the RGB color primaries as well as white point for the color LCD panel as a function of driving the achromatic LCD panel at various values. In FIG. 13, the vertices of triangle 1346 represent the RGB components of the displayed color in response to driving the achromatic LCD panel at a low level (P=51), the vertices of triangle 1343 represent the RGB components of the displayed color in response to driving the achromatic LCD panel at a higher level (P=204), the vertices of triangle 1342 represent the RGB components of the displayed color in response to driving the achromatic LCD panel at an even higher level (P=255), the vertices of triangle 1341 represent standard Rec. 709 RGB values (for reference), and the vertices of triangle 1340 represent standard DCI P3 values (also for reference). Point 1346W represents the white point of the displayed color in response to driving the achromatic LCD panel at the high level (P=255), point 1343W represents the white point of the displayed color in response to driving the achromatic LCD panel at the intermediate level (P=204), and point 1342W represents the white point of the displayed color in response to driving the achromatic LCD panel at the low level (P=51). Arrow W indicates the direction of shift of the white point (the direction of white point tracking) with decreasing achromatic LCD drive level. Arrow R indicates the direction of shift of the red primary with decreasing achromatic LCD drive level. Arrow S indicates the direction of shift of the green primary with decreasing achromatic LCD drive level. Arrow T indicates the direction of shift of the blue primary with decreasing achromatic LCD drive level.

It may be the case that the display exhibits a shift in color toward blue when the achromatic LCD panel is driven from high pixel values to low pixel values. In other words, the achromatic LCD panel is not truly achromatic as idealistically assumed. Detailed spectral transmission measurements on the display revealed that for a constant color LCD panel drive signal, the transmission for blue wavelengths decays slower than other parts of the spectrum when the achromatic panel is driven from high pixel values to low pixel values.

Some embodiments of the present invention provide extended viewing angles. The use of conventional LCD panels (without red, green or blue color filters) as achromatic LCD panels allows for much greater resolution of contrast enhancement, when each achromatic LCD panel is used as a background or foreground panel with another (color LCD) panel. This extra resolution becomes even more important when an achromatic LCD panel is coupled a color LCD panel having a different resolution, as it allows for adjustable viewing angles across the display with minimized visual artifacts.

In the case that the achromatic panel has pixels (referred to as "sub-pixels" since they are smaller than pixels of the color LCD panel in the same image chain) in clusters of four in a square configuration (each 2×2 cluster of subpixels of the achromatic panel aligned with one pixel of the color LCD panel), greater control is possible as this doubles the resolution in both horizontal and vertical directions. Existing image processing techniques for image scaling can be applied to these sub-pixel clusters if treated as individual control points, allowing for variable viewing angles and distances. To widen viewing angles (e.g., to accommodate multiple simultaneous viewers), a Gaussian or similar low pass filter can be applied to the achromatic panel drive values.

In some embodiments, the inventive display includes modulators in addition to an achromatic LCD panel and a color LCD panel, and it is within the scope of the invention to generate drive signals for all such modulators. For example, a display with three modulating LCD panels (e.g., two achromatic LCD panels and a color LCD panel) can be driven in accordance with some embodiments.

The present invention has been described using the terms image-generating panel (or color LCD panel) and contrast-enhancing panel (or achromatic LCD panel). It should be understood that both panels generate images, and both panels impart contrast into a final image for display. The image-generating panel, in typical embodiments, imparts color and contrast through a combination of filtering and brightness modulation, and the achromatic LCD panel imparts contrast, or enhancing contrast, via brightness modulation. It should also be understood that in variations on the described embodiments, the achromatic LCD panel could also include color filtering, or other variations of function in one or both of the achromatic panel and color panel could be implemented.

Additional Processing Embodiments Based on Other Metrics

It will now be described other embodiments for improving the performance of display systems disclosed herein based on other metrics, such as Just Noticeable Difference (JND) or the minimization of certain visual effects. As will be disclosed below, for display systems comprising, e.g., two LCDs panels in series and having a knowledge of the individual transmittance of each panel, then it may be possible to improve rendering on the overall display system—for example, by improving issues with contouring, or having better level precision or the like. It will be appreciate that the various embodiments of the additional processing modules and/or algorithms presented herein work with the various embodiments of dual-panel display systems that may comprise a first, image-generating panel and a second, contrast-improving panel.

Figure 14:
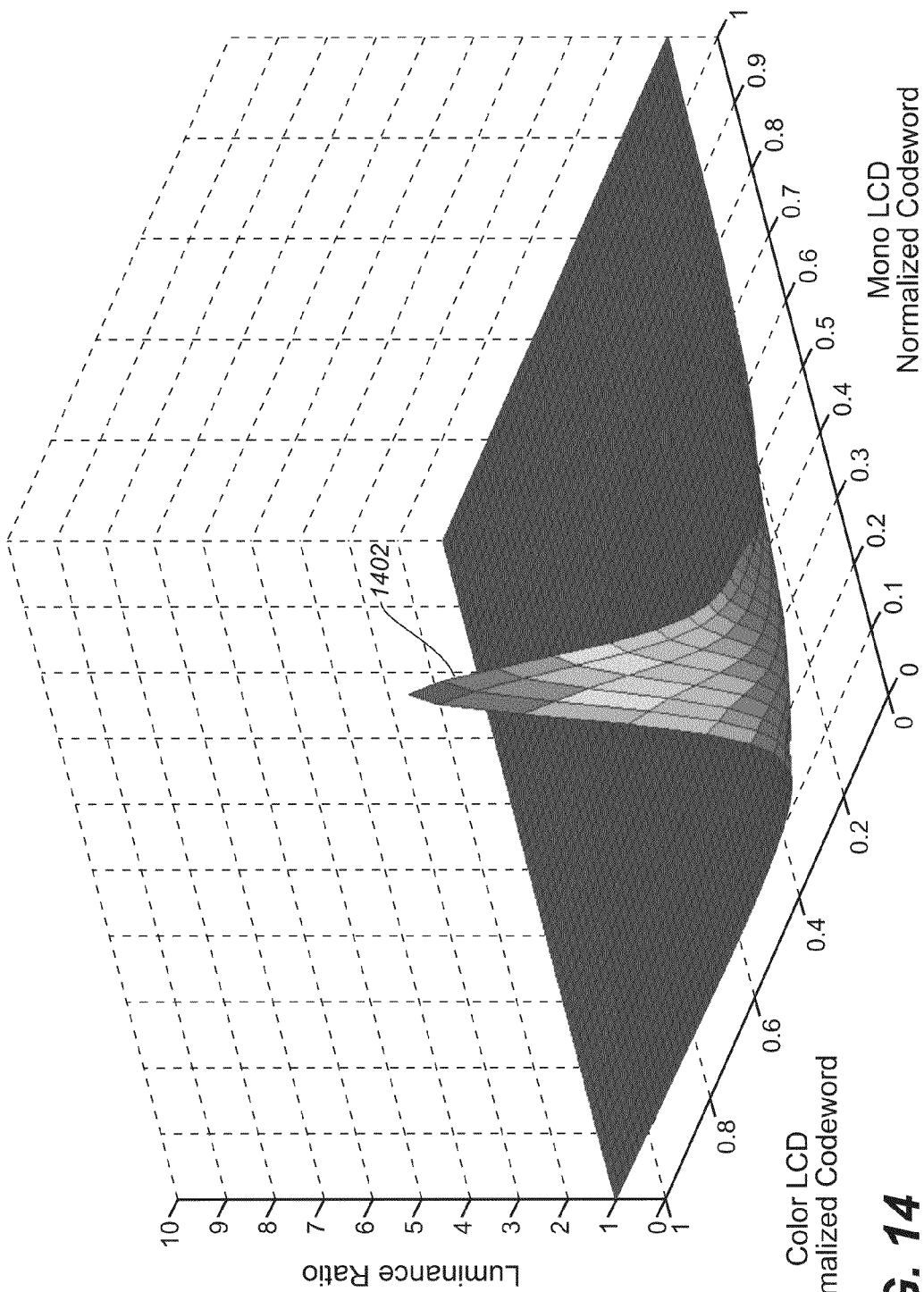
FIG. 14 is a mapping of mapping of codeword (CW) pairs of a first and a second LCD panel into a luminance/transmittance ratio.
Figure 15:
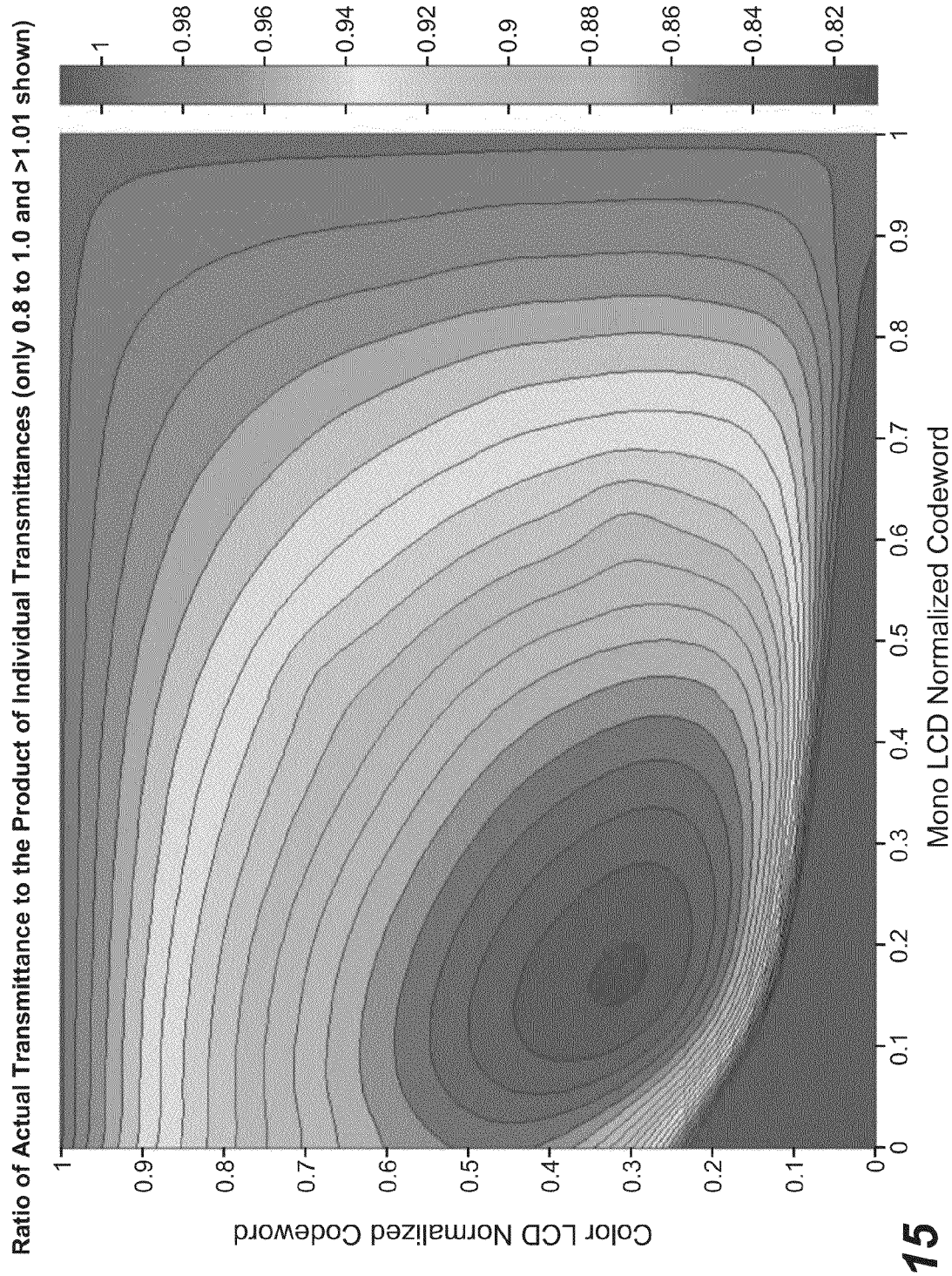
FIG. 15 is a top view of the mapping of FIG. 14 with contour lines showing the luminance/transmittance ratio as a function of CW pairs.

As what might be expected in an idealized display system, the overall transmittance of the display system might be a simple product of the transmittance of the individual panel. However, in practice, this situation does not appear to be the case. FIGS. 14 and 15 depict the deviation from the idealized display system. CW pairs (e.g., Mono LCD CW and Color LCD CW) are shown mapped into the luminance and/or transmittance ratio of the actual overall transmittance of the overall display system to the idealized transmittance. In particular, the display system in question may be one that comprises a monochrome LCD (Mono LCD) in series with a chromatic LCD (Color LCD). As each LCD (Mono and Color LCD) may be driven by codeword (CW) values (e.g., in some display space, linear or otherwise), their individual LCD panel transmittance is shown in FIG. 14 as the aforementioned ratio. Thus, the overall transmittance of the display system is shown as a function of CW pairs for the Mono LCD and Color LCD. In one embodiment, CWs may be embodied as digital values [0,255] for each panel—or any other suitable scale. The CWs may be then normalized [0, 1] for the sake of presentation, as shown in FIGS. 14 and 15.

It should be appreciated that the luminance and/or transmittance ratio is that ratio of the actual luminance and/or transmittance of the overall display system versus the luminance and/or transmittance that might be expected as the product of the luminance and/or transmittance of two LCD panels taken separately. Thus, a luminance and/or transmittance ratio of ONE implies that the overall display system behaves in a manner expected by taking the product of the luminance and/or transmittance of the two LCD panels. As may be seen, for the majority of CW pairs, the luminance and/or transmittance ratio is close to ONE—indicating that the display system, for the most part, matches the idealized transmittance, i.e., of the product of the transmittance of individual panels. This area of ratio approximately equal to ONE appears somewhat as a flat region in FIG. 14.

However, as indicated by the region 1402, it may be seen that there are CW pairs for the two panels that results in the overall display system being in substantial variance with the idealized display system—with the overall display system luminance and/or transmittance ratio varying from 1 to 6 or more.

FIG. 15 is a top view of FIG. 14; but presents the luminance and/or transmittance ratio as a contour mapping that gives more information regarding the flat region presented on FIG. 14. This contour mapping depicts variances from about 0.8 at the low end, to 1.0 and more at the high end of the luminance and/or transmittance ratio. So, for example, in the lower right hand corner of contour mapping (e.g., CW pair (0.1, 0.1)), the contour map shows that the ratio is off the chart—corresponding to part of the peak ratio region 1402 in FIG. 14. The majority of the contour map (e.g., for CW pairs having Color CWs>0.25) is showing the variance found in the flat region in greater detail that that shown in FIG. 14. It will be appreciated that the data found in FIGS. 14 and 15 may be determined in a number of different ways. For example, the data may be determined by measurement of actual display systems—or, the data may be heuristically determined by some model of panel and/or display system behavior, or some combination of measurement and heuristics.

Even at this finer level of variance data, the differences in ratio in FIG. 15 may be sufficient to require determining the total transmittance as a function of CW pairs, as opposed to being modeled as the product of the transmittances of each individual panel.

One possible metric to consider for the proper rendering of images to viewers involves Just Noticeable Difference (JND) steps. For example, if during the selection of CWs, the desired image may present itself with a given number of JND steps (e.g., 2 JND steps, 3 or more JND steps). In general, the higher number of JND steps that are potentially presented in smooth image areas, the less accurate the image rendering may be. For example, higher JND steps may translate into undesirable contouring issues in the final image. As discussed herein, the various embodiments herein may seek to minimize the number of possible JNDs within a smooth image area presented to the viewer.

Figure 16:
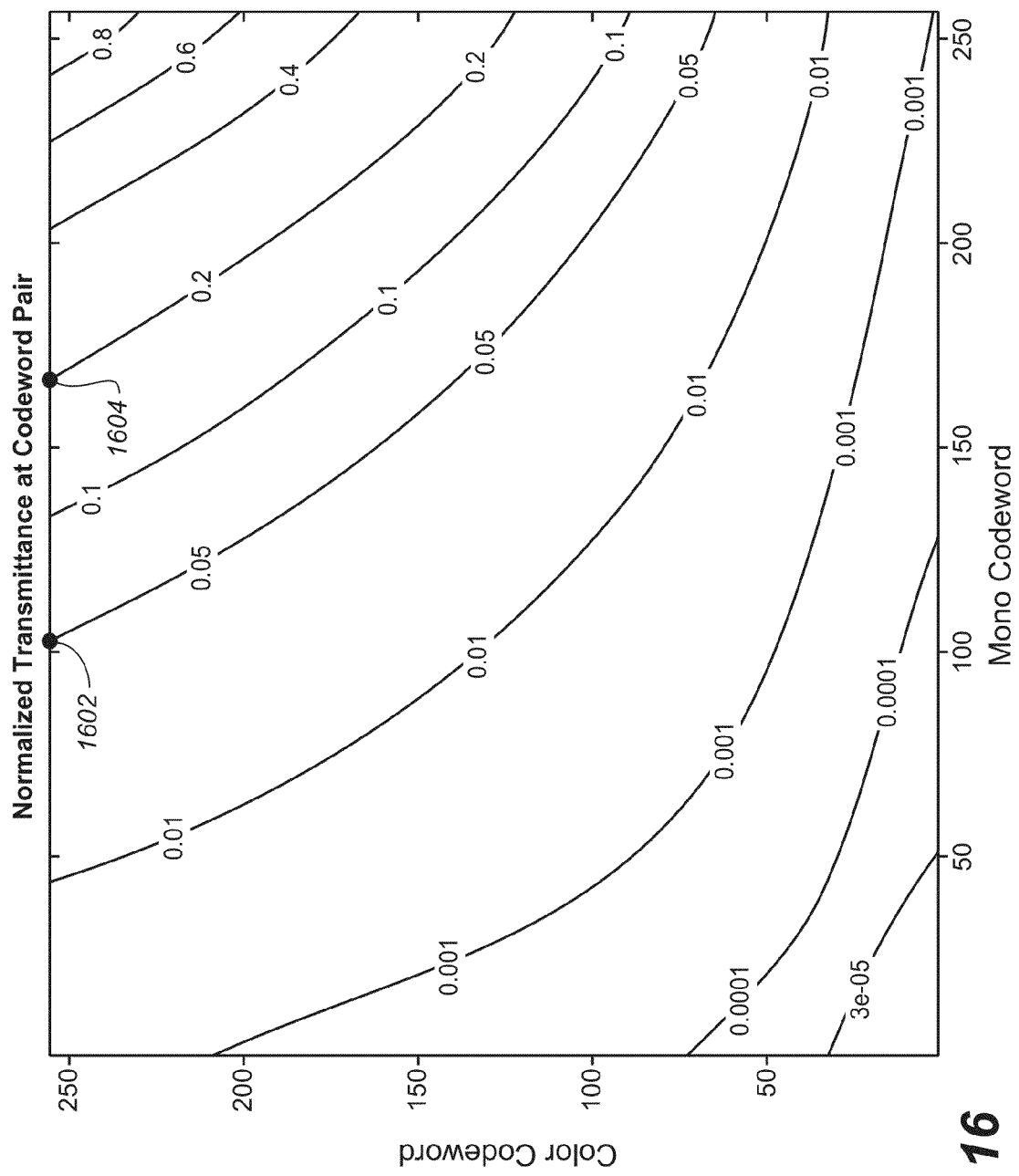
FIG. 16 is a mapping of CW pairs into iso-luminance/transmittance lines for a dual-panel display system as made in accordance with several embodiments of the present application.

FIG. 16 depicts a contour map that shows transmittance as a function of Mono/Color (or First/Second) CW pairs. In FIG. 16, the CWs are made to range from [0,255]. Several iso-transmittance lines may be seen as plotted within this Mono/Color (First/Second) CW area. For example, normalized luminance/transmittance line of 0.01 may be seen ranging in the middle of the CW area—from the upper right hand (starting at about (50, 255) CW pair) to the lower left hand (ending at about (255, 40) CW pair). These lines of iso-luminance/iso-transmittance give a degree of freedom in selected a possible optimal or more desired CW pair for any given input image pixel, data and/or metadata, as discussed herein.

In one embodiment, it may be desired to choose the Mono (or First) CW such that the changes in Mono/First CW are smooth and/or minimized. If Mono/First CWs points are allowed to change greatly over space, then the display system may experience undesirable effects, such as the parallax problem as discussed herein. Choosing a Mono/First CW that may change quickly over space may exacerbated this problem—as a fast changing Mono/First CW may also necessitate a fast changing Color/Second CW in order to compensate. The combination of fast changing CW pairs may lead to such undesirable visual effects.

As will be discussed in greater detail with respect to the display system control module of FIG. 22, it may be desirable to select Mono/First CWs to be the minimum allowable along these iso-luminance/transmittance lines as possible. Such a selection may tend to keep the Mono/First illumination image to be as dim as possible. Such a dim, first illumination image may tend to promote a final image that tends to reduce parallax problems, as discussed herein. For the sake of illustration, if an image point calls for a normalized transmission for the display system to be 0.05, then it may be desirable to select Mono/First CW to be about 100 (i.e. substantially minimum along the 0.05 iso-luminance/transmittance line). If the normalized transmission for the display system is desired to be 0.2, then it may be desirable to select Mono/First CW to be about 170.

Figure 17:
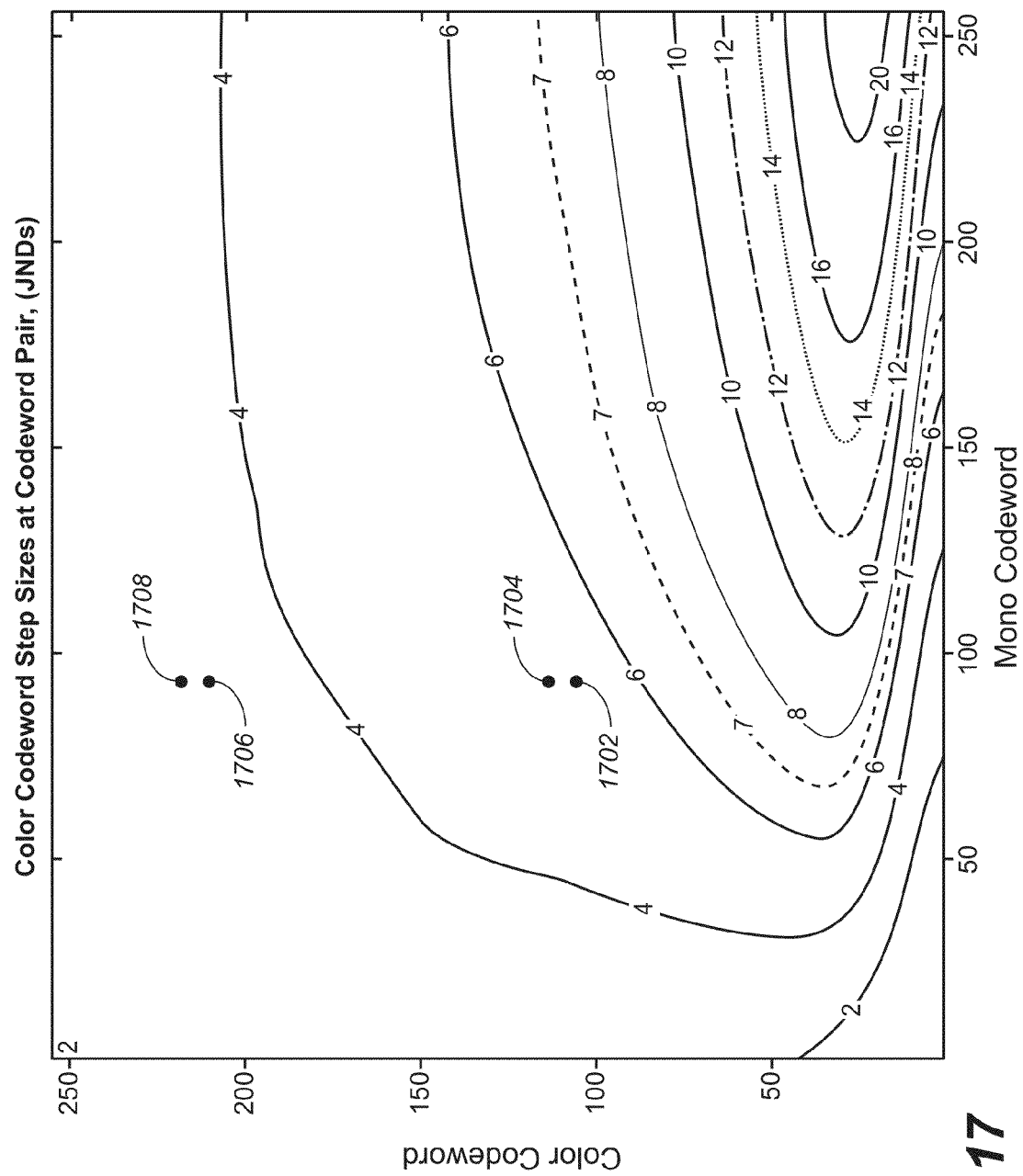
FIG. 17 is a mapping of CW pairs into iso-JND steps when holding the first panel's CW constant for a dual-panel display system as made in accordance with several embodiments of the present application.

It is known that issues with contouring often occur in images that have a flat field—or have smooth gradient changes. It may be desirable for the display system to select CW pairs in a local region of the image that have a certain level—such that, within the vicinity of the CW pairs, the JND step levels are minimized. FIG. 17 shows one embodiment of a mapping of possible iso-JND steps line that may be rendered on a display system—depending on the choice of CW pairs. As noted, the higher the JND steps, the more likely it is for contouring visual effects to be found in a given rendered image. It may be desirable, then, to select CW pairs that may meet certain conditions (e.g., a given luminance/transmittance level) while minimizing the potential number of JND steps.

For example, consider JND steps associated with CW pairs that occur along Mono/First CW line 100 (that is, as Mono/First CW is allowed to vary stepwise). Points 1702, 1704 represent CW pairs (100, 100) and (100, 101), respectively. If the CW pair were to make such a step size change as given by points 1702 to 1704, the display system is in a operational region of approximately 6 JND steps. However, considering points 1706, 1708 (corresponding to CW pairs, (100, 200) and (100, 201) respectively), then the display system is in an operational region of approximately 4 JND steps—which is potentially less noticeable than for points 1702, 1704.

Figure 18:
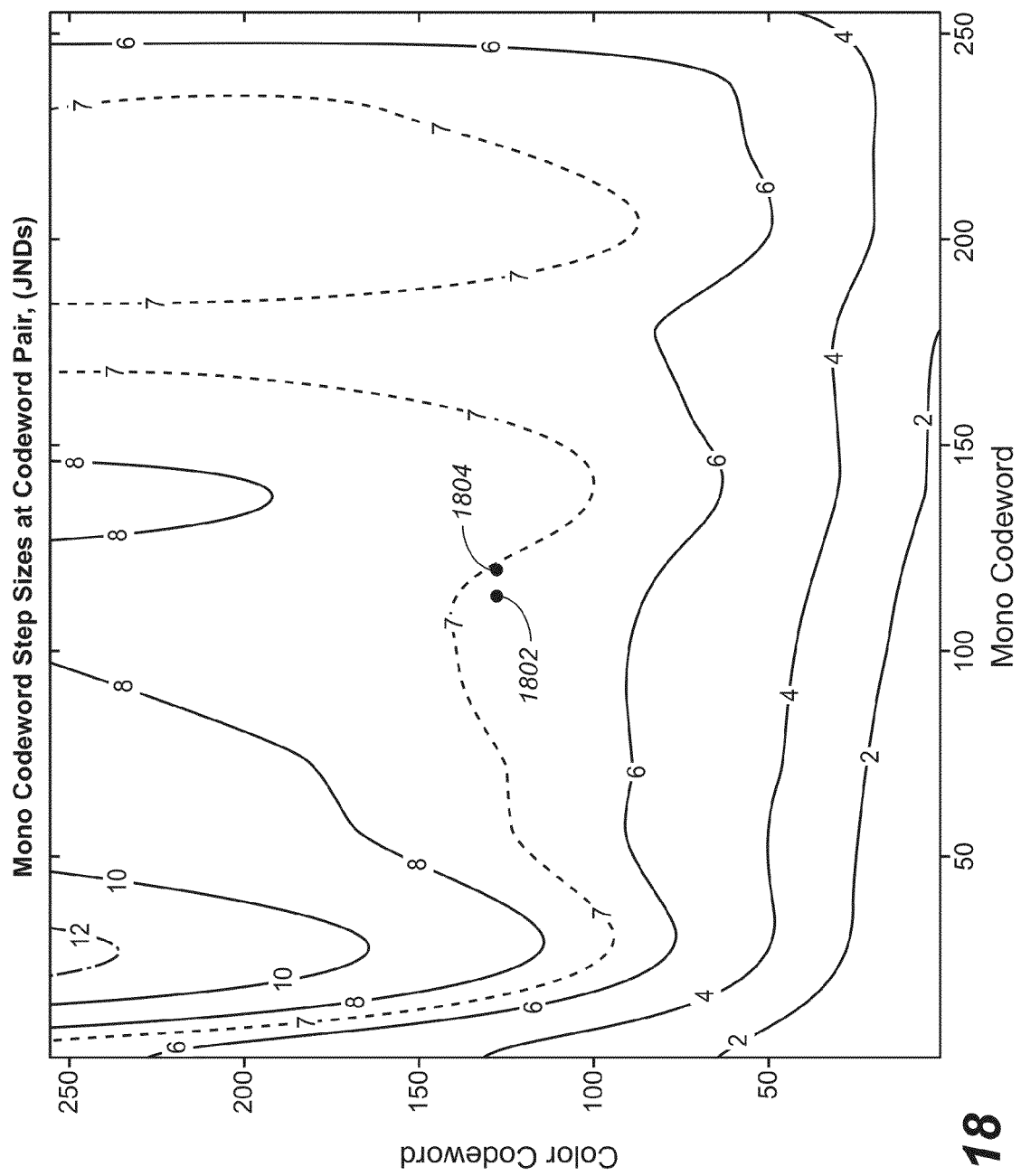
FIG. 18 is a mapping of CW pairs into iso-JND steps when holding the second panel's CW constant for a dual-panel display system as made in accordance with several embodiments of the present application.

FIG. 18 depicts similar information as FIG. 17, except that the Color/Second CW is allowed to vary—while holding Mono/First CW substantially the same. For example, consider points 1802, 1804 (corresponding to CW pairs (100, 125), (101, 125) respectively). The display system, in this case, would be operating in a range of approximately 7 JND steps. It should be appreciated that both the contour maps of FIGS. 17 and 18 may be derived (either by measurement or heuristically) by considering these stepwise changes in one CW (while holding the other CW constant) and deciding how many JND steps may be visible in certain images.

Figure 19:
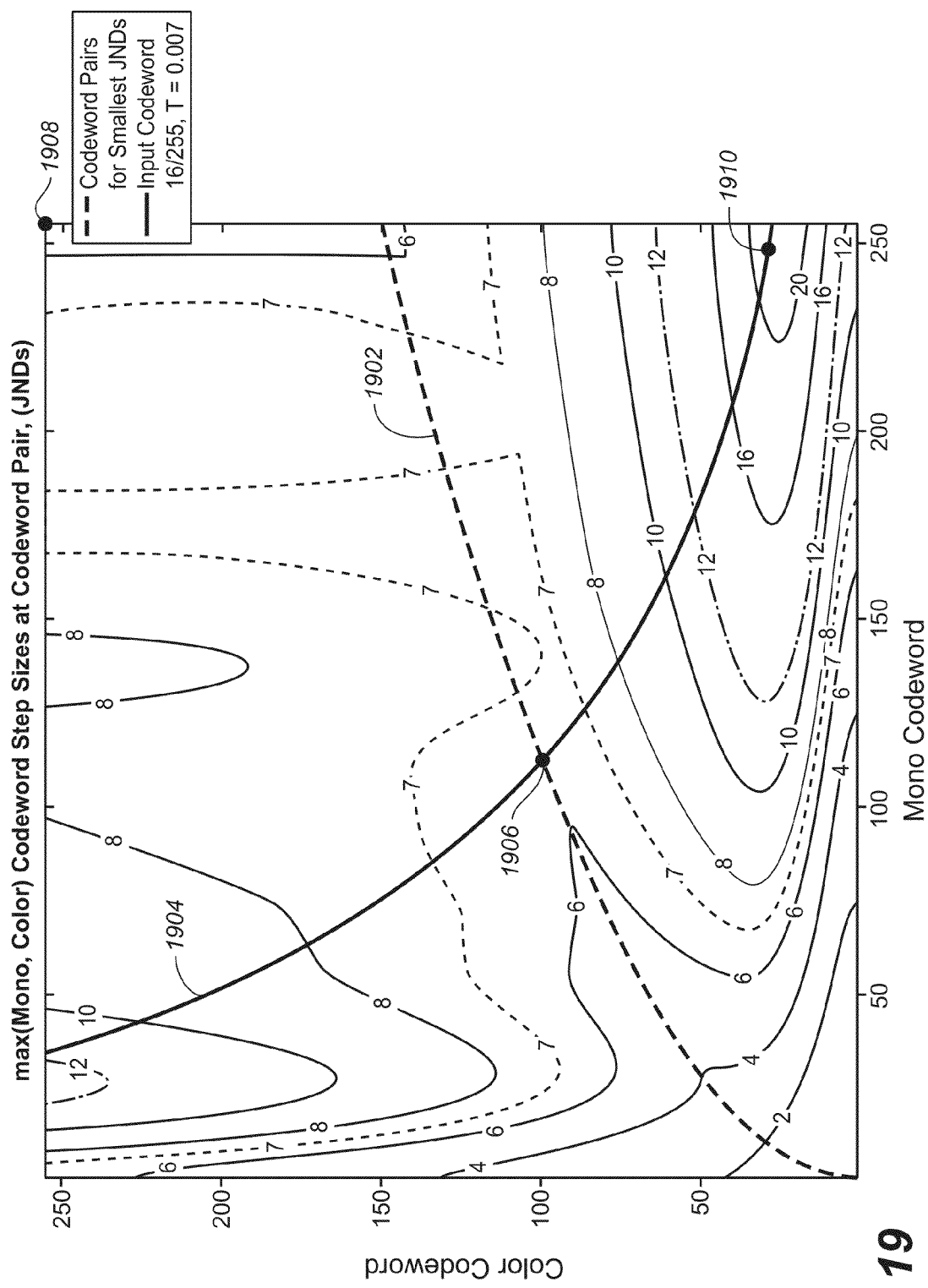
FIG. 19 is a composite mapping in CW pair space of the iso-JND step lines of FIGS. 17 and 18 in order to aid in affecting control of a dual-panel display system.

Now, FIG. 19 is a composite map of information presented in FIGS. 17 and 18, showing the maximum JNDs from each. As may be seen, bold dashed line 1902 somewhat divides the region of CW pairs into an upper portion and a lower portion. The upper portion substantially resembles iso-JND step lines when the Mono/First CW are allowed to incrementally vary (while holding Color/Second CW constant) of FIG. 18. The lower portion substantially resembles the iso-JND step lines when the Color/Second CW are allowed to incrementally vary (while holding the Mono/First CW constant) of FIG. 17.

The bold dashed line 1902 represents a line of choice of CW pairs that may tend to reduce the number of JND steps, thus tending to reduce the contouring issue in substantially flat field images. Now, bold solid line 1904 represents merely one line in the iso-luminance/transmittance contour map of FIG. 16. In particular, bold solid line 1904 substantially represents the iso-luminance/transmittance of 0.007 in FIG. 16. Thus, one embodiment of a control module may be given as follows: if minimizing JND steps was a desirable effect for an image that potentially would exhibit contouring and the image was calling for a normalized luminance/transmittance of 0.007, then the display system may choose the CW pair 1906—which represents the point of intersection of curves 1902 and 1904.

Figure 22:
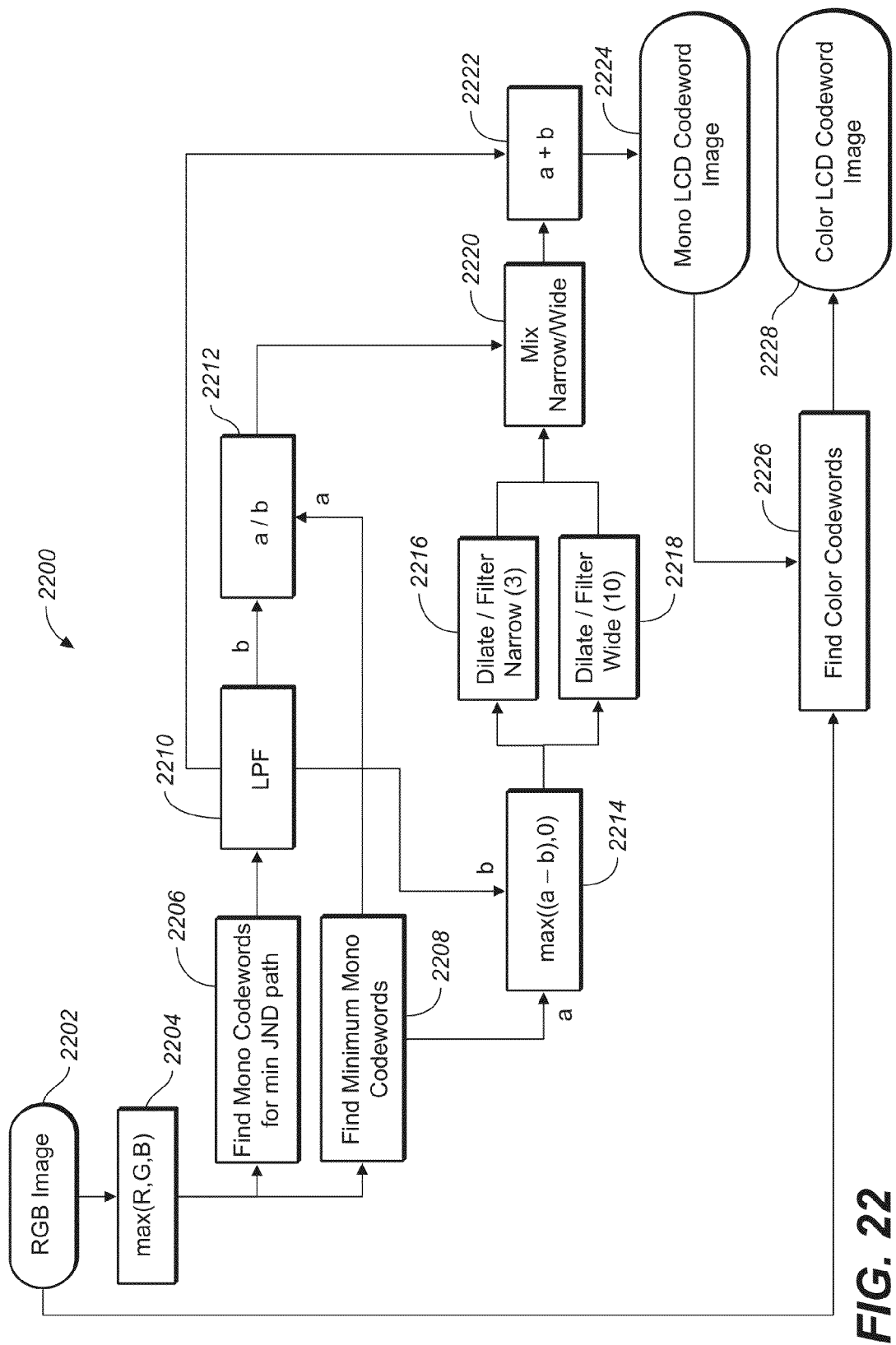
FIG. 22 is a block diagram of one embodiment of a control module/algorithm for selecting CW pairs that tend to improve image rendering to the viewer of a dual-panel display system as made in accordance with several embodiments of the present application.

In addition, this control module/algorithm approach may be used to affect the module block 2206 in FIG. 22. Module 2206 attempts to find the Mono/First CW for a minimum JND path for a given image input (e.g., on a pixel-by-pixel basis, window basis or the like)—which may be given by traversing FIG. 19 as described above.

Another aspect of FIG. 19 depicts how the display system may dynamically render an image that presents a substantially stark contrast in luminance/transmittance as possibly desired by the input image data. For merely the purposes of exposition, consider input image data that corresponds to a white dot on a flat gray field. Assume that the display system is processing input image data in the middle of the white dot; but that the input image data is moving to transition from the white dot to the flat gray field. Point 1908 represents the CW pair meant to render the middle of the white dot (i.e., CW pair (255, 255) for maximum luminance/transmittance). Now, the input image data is transitioning to the edge of flat gray field (e.g., near the edge of the white dot). Initially, it may still be desired to have the Mono/First CW to be substantially 255— while the Color/Second CW appropriately moves down (as indicated by point 1910) to a desired transmittance level such as 0.007 (which may be appropriate for the edge of the flat gray field). As the image data moves further away from the edge of the white dot (and depending on the size of the filtering of Mono CW as given in block 2216 and 2218), the display system may move up along the bold solid line 1904 to settle at point 1906 (which tends to minimize the number of JND steps). This processing may be accomplished on the order of a few pixels to a few hundred pixels—depending on the image data and the size of the Mono/First CW filtering.

Analysis of Display System

Figure 20:
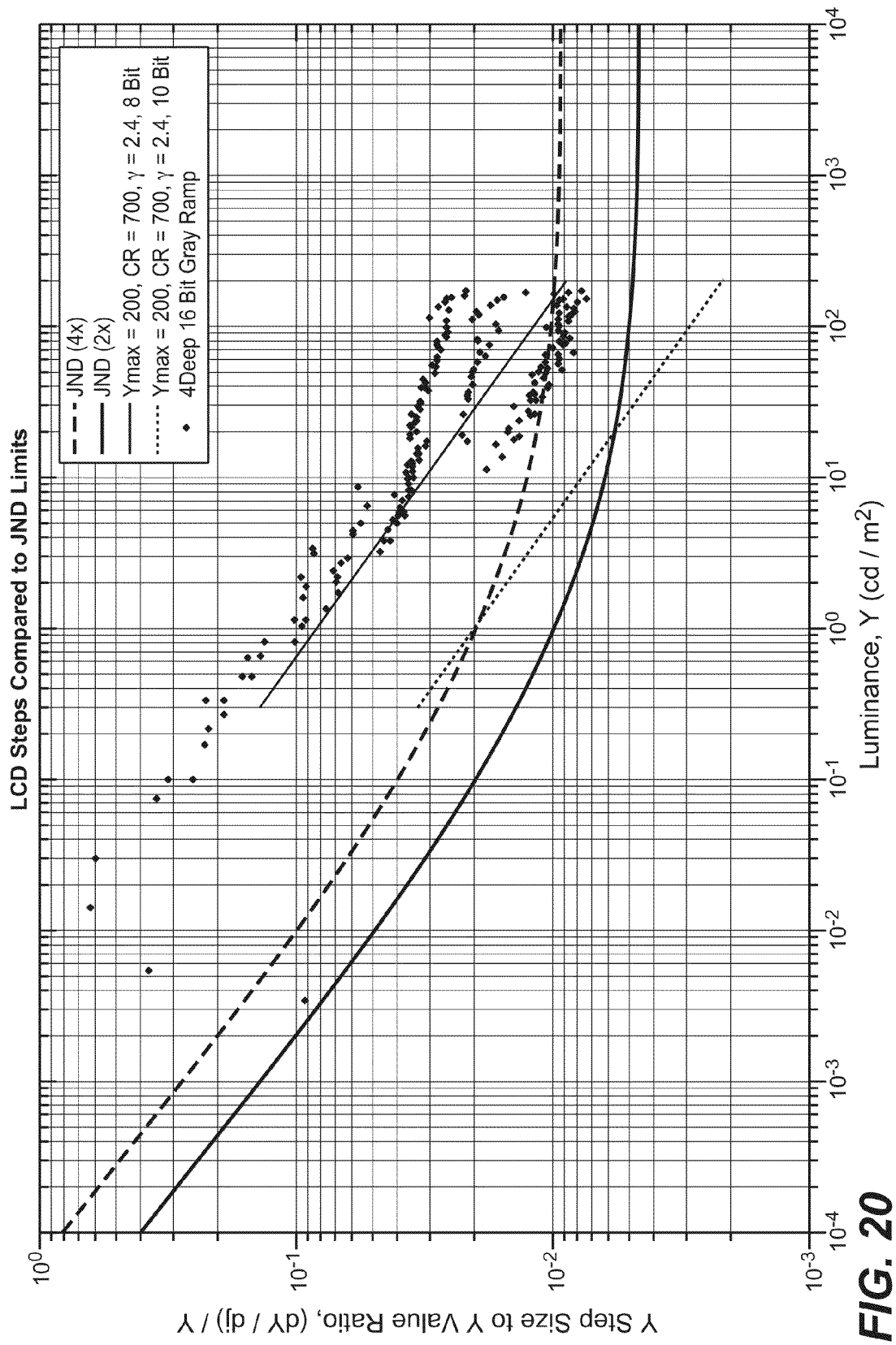
FIG. 20 is a mapping of luminance to perceptible luminance difference as a measure of final image rendering.

FIG. 20 is a mapping of luminance to perceptible luminance difference as a measure of final image rendering for a dual-panel display system that may not perform any of the additional control modules or algorithms disclosed herein to reduce contouring issues or improve level precision or the like.

Figure 21:
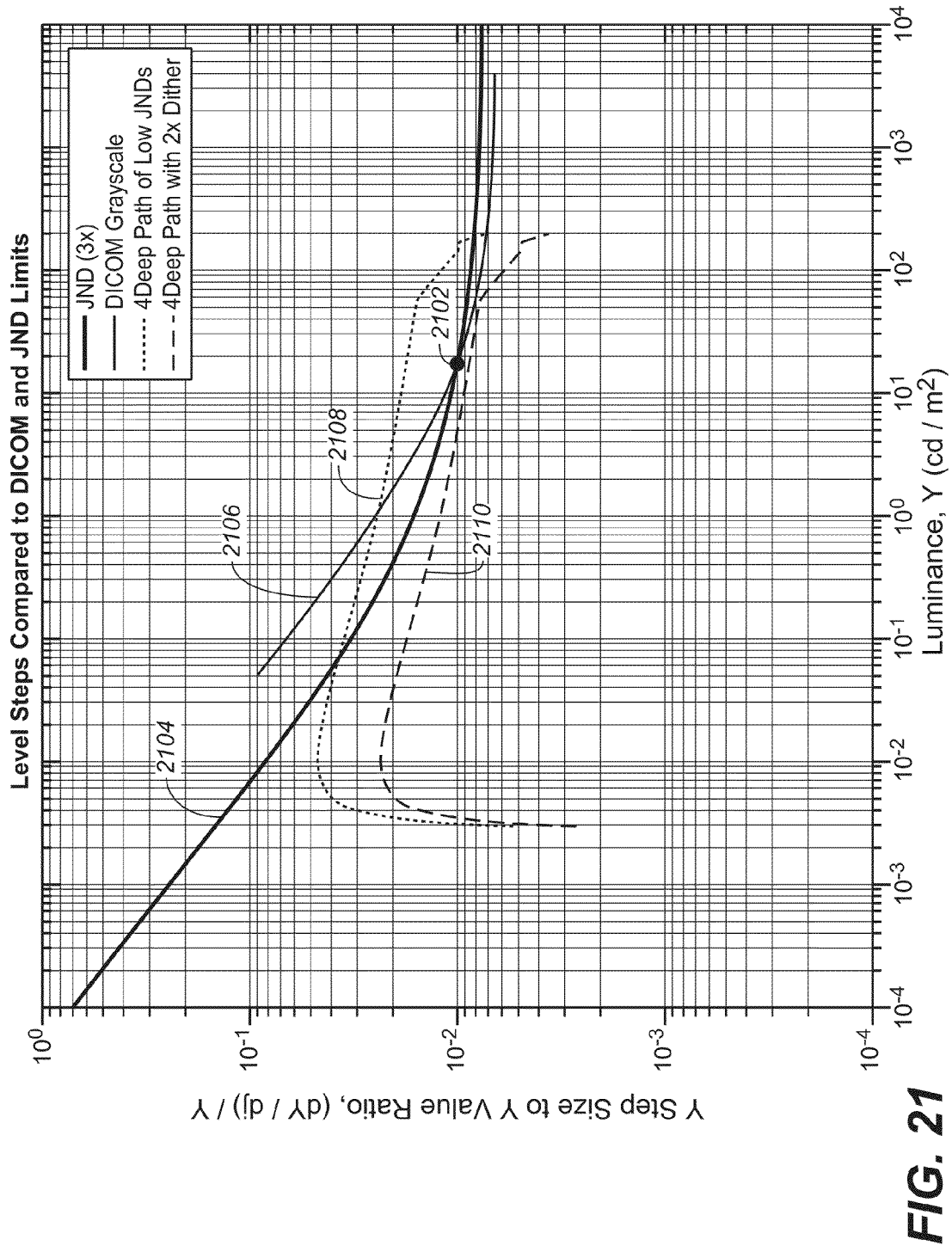
FIG. 21 is a mapping of luminance to perceptible luminance differences as a measure of final image rendering employing low JND processing and dithering in dual-panel display systems.

By contrast, FIG. 21 depicts a mapping of desired luminance (on the x-axis) versus the amount of luminance difference (in step size) which becomes noticeable by a human viewer—when a dual-panel display system may be affecting low JND step processing or improved level precision or the like. Thus, for example, point 2102 indicates—at 10 nits of luminance—what the step size would be have to be in order to be noticeable for contouring. As a rule of thumb, humans can see about a 1% luminance difference—so, at 10 nits of luminance, 0.1 nits of step size is needed to produce a noticeable visual effect. The bold solid line 2104 indicates one performance curve of 3 JND steps. The regular solid line 2016 indicates one performance curve as indicated by DICOM grayscale.

The dashed line 2108 indicates the performance of the display system under the control modules and algorithms described herein to handle contouring issues. The dashed line 2110 indicates the performance of the display system employing this control module and algorithms—in addition to applying some dithering techniques that are used to control contouring (e.g., spatial, temporal, spatio-temporal dithering).

It may be seen that the control module and algorithms described herein tend to keep the performance of several embodiments of the display system described herein near the 3 JND curve and closer to performance as compared with DICOM grayscale. With added dithering techniques, the display system performance would tend to keep the contouring issues at or under 3 JND steps.

One Embodiment of a Control Module for Selecting Codeword Pairs

As mentioned, FIG. 22 depicts one possible control module for selecting CW pairs that would tend to minimize certain undesirable visual artifacts—e.g., contouring problems, level precision issues, parallax problems and/or other visually noticeable effects.

The control module in this embodiment works particularly well for an overall display system in which the first LCD panel is a monochrome LCD panel and the second LCD panel is a chromatic LCD panel—in which the Mono LCD presents a first, lower resolution illumination of the intended image to be rendered and the Color LCD provides the final illumination as a high resolution rendering of the intended image to be presented to the viewer. In one embodiment, the control module of FIG. 22 may be placed into the controller block 1016 (entitled "Dynamic Range Splitter") in FIG. 10 mentioned above. This control module, of course, may be suitably implemented in many other parts of the display system.

It will be appreciated that suitable changes to the control module are contemplated in this present application, depending upon the actual construction of the final display system. Thus, slightly different processing steps may be desired— depending on whether the both panels are Mono LCD panels, Color LCD panels, of different resolutions, or if the panels are presented in a different order (e.g., first panel Color LCD and second panel Mono LCD).

Finding Mono and/or First Codewords

As is discussed further herein, the control module of FIG. 22 proceeds by finding Mono/first panel CW (e.g., depending on what the first panel may be comprising the display system) in order to effectively render an intended image to the viewer—and then, after some filtering of first illumination image provided by the first Mono LCD panel, the Color CWs for each color channel are found to provide the final intended image. It would be appreciated that if the second panel were another Mono LCD panel, then the second CW may be a single data value, as opposed to a multi-channel valued data.

In one embodiment of a set of systems and/or methods that find a first CW and a second CW for driving the first and second panel respectively, it may be desired to select a first minimum CW for driving said first image-generating panel that is substantially the minimum CW value among the set of possible CW pairs that satisfy a desired luminance setting according to input image data. In addition, it may be desired to select a first minimum JND CW for driving said first image-generating panel is substantially the CW for minimum JND steps among the set of possible CW pairs that satisfy a desired luminance setting according to input image data. Once such first CWs may be selected, it may be desirable to combine minimum CW image data and minimum JND CW image data. Such combining may be any number of image processing functions known in the art—e.g. filtering, dilating, spreading, deriving values for further processing, and the like.

It may also be appreciated that image processing may proceed on a pixel by pixel basis in one embodiment. Alternatively, in another embodiment, the processing may proceed on a number of pixels in a spatial proximity—e.g. in a given window of image data. CW image data may taken and/or extracted from such spatial image data or from such pixel data. CW image data may be the result (e.g., intermediate or final) of some image processing based upon, or derivable from, such spatial image data and/or pixel data input into the system. For example, codewords used to drive image panels may be derived from such CW image data. As described herein, CW image data may be embodied as the data derived from many of the figures disclosed herein—e.g., FIGS. 14 to 19. CW image data may be embodied as a LUT that such reflect such data.

In FIG. 22, input image data 2202 (e.g., in RGB format, or any other suitable format) is given to block 2204 where max (R, G, B) value is determined for the input image data. In one embodiment, this processing may proceed on a pixel-by-pixel basis—or on some windowing of input image data. In another embodiment, peak luminance data may be extracted from the input image data—to aid in the subsequent dilating and/or filtering, as discussed.

Once the max (R, G, B) data is found, this value is passed along to blocks 2206 and 2208 which find Mono (and/or First) CW for a minimum Just Noticeable Difference (JND) path and minimum Mono/First CW, respectively. The minimum Mono/First CW is selected in order to make the Mono/First image to be a dim as may be possible, while still providing a suitable final image. This minimum Mono/First CW may be used as a parameter (denoted as "a", in FIG. 22) to be used by other processing modules.

Adaptive Filtering for First Illumination

In an embodiment that has a first Mono LCD panel and a second Color LCD panel, one aspect of control may be to control the amount of blurring the Mono LCD panel performs on the first illumination depending on the input image data and/or metadata—to mitigate parallax in the final intended image to a viewer. For example, such control may be effected by Dilate/Filter Narrow 2216 and Dilate/Filter Wide 2218 blocks in FIG. 22.

To illustrate the narrow and wide dilate/filter block operations, consider an intended image to be rendered as a small white dot on a dark/black background. Further suppose that the narrow filter and the wide filter are both some form of Gaussian filters—where one filter spreads the energy less when compared with the other filter. Depending on the absolute levels of the white dot and the background, more or less spreading could be desired to reduce and/or mitigate the parallax.

In some embodiments, it may be desirable to design filtering blocks 2216 and 2218 such that their effects is to stretch a Gaussian filter over the putative white dot—but in some cases, such that the peak illumination is substantially equal to the peak illumination of the intended image. In such a case, some energy may be added to the first illumination over and above that presented in the input image data. In one filtering block, the stretching is more pronounced than the other filtering block. Mixing block 2220 may determine the desired amount of stretching to be presented by the first Mono LCD panel; but where the peak energy is preserved from the input image data.

One reason to filter and mix the first illumination in such a fashion is to adequately address a potential parallax problem that may be present in such dual-panel/multiple panel display systems. In such a display system, it may be the case that misalignment of pixel illumination between the first and second LCD panels may produce an undesired change in illumination presented to the viewer.

This effect may also be more pronounced in the case of off-axis viewing. For example, assume that the viewer is seeing such a white dot at an angle (e.g., 45 degrees) to the normal axis of the display system. In this case, it is possible that the white dot may disappear to this viewer, due to the misalignment of the pixels between the first LCD panel and the second LCD panel. As this would be noticeable to a human viewer, this effect may be completely undesirable in a display system intended to render fine detail—such as may be desired for medical imaging applications or other applications, like astronomical (e.g., star fields) image rendering.

Mix Narrow/Wide block 2220 may provide the desired adjustment to these two dilation/filtering operations—depending on the input image data and/or metadata. In one embodiment, it is possible to perform an alpha blending of two operations, as is known in the art.

Final CW Pairs Selection

As mentioned above, module 2206 may find the Mono/First CW for min JND path as disclosed in reference to FIG. 19 above. Module 2208 may find minimum Mono/First CW as disclosed in reference to FIG. 16 above. Low Pass Filtering 2210 may be employed to produce another parameter "b"—used for further processing blocks 2212, 2214 through 2222. At 2224, the control module has selected the Mono/First CW for the image data at issue.

From the selection of Mono/First CW for the input image data, the control module selects Color/Second CW (i.e., for each color channel, if second panel is Color LCD). This selection may proceed as discussed above depending on the input image data and the various figures discussed above. As noted, this selection of CW pair may be made in order to minimize certain potential undesirable visual effects.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, HD-DVD, Blue-ray, CD-ROMS, CD or DVD RW+/−, micro-drive, and magneto-optical disks, ROMs, RAMs, EPROMs, EEPROMs, DRAMs, VRAMs, flash memory devices (including flash cards, memory sticks), magnetic or optical cards, SIM cards, MEMS, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, calculating pixel/sub-pixel blurring of a local dimming panel, calculating color correction or characterizations, preparing image signals and applying them to driver and/or other electronics to energize backlights, panels, or other devices in a display, calculating luminance values, interpolating, averaging, or adjusting luminance based on any of the factors described herein, including a desired luminance for a pixel or region of an image to be displayed, and the display, storage, or communication of results according to the processes of the present invention.

The present invention may suitably comprise, consist of, or consist essentially of, any of element (the various parts or features of the invention) and their equivalents as described herein. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

The invention claimed is:

1. A dual-panel display system comprising:
a backlight;
a first image-generating panel;
a second contrast-improving panel;
a control module for selecting a codeword (CW) pair for driving said first image-generating panel and said second contrast-improving panel respectively according to input image data; and
further wherein said control module is capable of selecting the CW pair to improve final image rendering presented to a viewer.

2. The display according to claim 1, wherein the first image-generating panel comprises a monochrome LCD panel.

3. The display according to claim 2, wherein the second contrast-improving panel comprises a chromatic LCD panel.

4. The display according to claim 3, wherein said control module is capable of selecting a first CW for driving said first image-generating panel from among a set of possible CW pairs that satisfy a desired luminance setting according to input image data.

5. The display according to claim 4, wherein said first CW for driving said first image-generating panel is substantially the minimum CW value among the set of possible CW pairs that satisfy a desired luminance setting according to input image data.

6. The display according to claim 4 wherein said first CW for driving said first image-generating panel is substantially the CW for minimum Just Noticeable Difference (JND) steps among the set of possible CW pairs that satisfy a desired luminance setting according to input image data.

7. The display according to claim 4 wherein said control module is capable of:
selecting a first minimum CW for driving said first image-generating panel that is substantially the minimum CW value among the set of possible CW pairs that satisfy a desired luminance setting according to input image data;
selecting a first minimum JND CW for driving said first image-generating panel is substantially the CW for minimum JND steps among the set of possible CW pairs that satisfy a desired luminance setting according to input image data; and
combining minimum CW image data and minimum JND CW image data according to said first minimum CW image data and said first minimum JND CW image data to select a final first CW for driving said first image-generating panel.

8. The display according to claim 7 wherein said control module is capable of filtering said CW image data by spreading the energy of said CW image data while substantially maintaining the peak energy of the CW image data.

9. The display according to claim 8 wherein said spreading of energy comprises dilating and filtering of said CW image data.

10. The display according to claim 9 wherein said control module is capable of selecting a second CW to drive said second contrast-improving panel according to said first CW selected to drive said first image-generating panel.

11. The display according to claim 10 wherein said second CW is selected among a set of possible second CWs to improve final image rendering presented to a viewer.

12. In a dual-panel display system, said dual-panel display system comprising: a backlight, a first image-generating panel, a second contrast-improving panel, a method for selecting a codeword (CW) pair for driving said first image-generating panel and said second contrast-improving panel respectively according to input image data; the steps of said method comprising:
inputting image data to be rendered by said dual-panel display system;
finding a first CW for driving said first image-generating panel based upon input image data; and
finding a second CW for driving said second contrast-improving panel, said first CW and said second CW comprising the CW pair, and wherein the CW pair improves final image rendering according to a desired metric.

13. The method of claim 12 wherein the step of finding a first CW for driving said first image further comprises:
extracting the maximum color component value from the input image data; and
finding a first CW for said first image-generating panel that meets the maximum color component value extracted from the input image data.

14. The method of claim 13 wherein the step of finding a first CW for said first image-generating panel that meets the maximum color component value extracted from the input image data further comprises:
finding the set of possible CW pairs of first CWs and second CWs; and
selecting the first CW that is substantially minimum among the set of possible CW pairs.

15. The method of claim 13 wherein the step of finding a first CW for said first image-generating panel that meets the maximum color component value extracted from the input image data further comprises:
finding the set of possible CW pairs of first CWs and second CWs; and
selecting the first CW that substantially minimizes the JND steps among the set of possible CW pairs.

16. The method of claim 12 wherein the step of finding a first CW for driving said first image generating panel further comprises:
extracting the maximum color component value from the input image data; and
finding the CW for said first image-generating panel that meets the maximum color component value extracted from the input image data and substantially minimizes the JND steps.

17. The method of claim 16 wherein the step of finding the CW for said first image-generating panel that meets the maximum color component value extracted from the input image data and substantially minimizes the JND steps further comprises:
finding the set of possible CW pairs of first CWs and second CWs; and
selecting from the set of possible CW pairs the first CW that substantially minimizes the JND steps.

18. The method of claim 12 wherein said method further comprises the steps of:
- finding the minimum CW image data;
- finding the minimum JND CW image data; and
- combining the minimum CW image data and the minimum JND CW image data to select a first CW.

19. The method of claim 18 wherein said step of combining the minimum CW image and the minimum JND CW image to select a final first CW image further comprises:
- filtering the minimum CW image data and the minimum JND CW image data with a narrow filter to create a first intermediate CW image data;
- filtering the minimum CW image data and the minimum JND CW image data with a wide filter to create a second intermediate CW image data;
- mixing said first intermediate CW image data and said second intermediate CW image data to create a third CW image data.

20. The method of claim 19 wherein the step of mixing said first intermediate CW image data and said second intermediate CW image data to create a third CW data image further comprises:
creating said third CW image data such that said third CW image data comprises energy spread out while substantially maintaining the peak energy derivable from the input image data.

21. The method of claim 12 wherein said method further comprises the steps of:
finding said second CW such that the selected CW pair substantially minimizes JND steps.

22. The method of claim 12 wherein said method further comprises the steps of:
finding said second CW such that the selected CW pair substantially minimizes contouring in said final image presented to a viewer.

23. The method of claim 12 wherein said method further comprises the steps of:
finding said second CW such that the selected CW pair substantially minimizes parallax in said final image presented to a viewer.

* * * * *